(12) United States Patent
Kanno

(10) Patent No.: US 10,592,117 B2
(45) Date of Patent: *Mar. 17, 2020

(54) MEMORY SYSTEM AND METHOD FOR CONTROLLING NONVOLATILE MEMORY

(71) Applicant: Toshiba Memory Corporation, Tokyo (JP)

(72) Inventor: Shinichi Kanno, Tokyo (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/207,418

(22) Filed: Dec. 3, 2018

(65) Prior Publication Data

US 2019/0102086 A1    Apr. 4, 2019

Related U.S. Application Data

(63) Continuation of application No. 15/209,579, filed on Jul. 13, 2016, now Pat. No. 10,175,887.

(30) Foreign Application Priority Data

Dec. 22, 2015 (JP) ................................. 2015-249553

(51) Int. Cl.
  *G06F 3/06* (2006.01)
  *G06F 12/02* (2006.01)
(52) U.S. Cl.
  CPC ............ *G06F 3/061* (2013.01); *G06F 3/0625* (2013.01); *G06F 3/0655* (2013.01);
  (Continued)

(58) Field of Classification Search
  USPC ........................................................ 711/103
  See application file for complete search history.

(56) References Cited

U.S. PATENT DOCUMENTS

| | | | |
|---|---|---|---|
| 8,725,931 B1 * | 5/2014 | Kang | G06F 12/0246 710/52 |
| 2010/0057976 A1 * | 3/2010 | Lasser | G06F 13/385 711/103 |

(Continued)

FOREIGN PATENT DOCUMENTS

| | | |
|---|---|---|
| JP | 2011203905 A | 10/2011 |
| JP | 2014146390 A | 8/2014 |

OTHER PUBLICATIONS

Japanese Office Action dated Oct. 2, 2018 in related Japanese Patent Application No. 2015-249553.

(Continued)

*Primary Examiner* — Hashem Farrokh
(74) *Attorney, Agent, or Firm* — Kim & Stewart LLP

(57) ABSTRACT

According to one embodiment, a memory system is configured to operate as one of semiconductor storage devices in a storage array. The memory system includes a nonvolatile memory and a controller. The controller executes a write operation of writing data, received from a host, to the nonvolatile memory, and an internal operation for managing the memory system. When starting the internal operation, the controller estimates a value related to an amount of reduction in performance of the write operation due to the start of the internal operation, based on content of the started internal operation, and notifies the host or one or more other semiconductor storage devices of the estimated value.

18 Claims, 23 Drawing Sheets

(52) U.S. Cl.
CPC ........ *G06F 3/0688* (2013.01); *G06F 12/0246*
(2013.01); *G06F 12/0253* (2013.01); *G06F
2212/1016* (2013.01); *G06F 2212/7204*
(2013.01); *G06F 2212/7205* (2013.01); *G06F
2212/7208* (2013.01)

(56) References Cited

U.S. PATENT DOCUMENTS

| | | |
|---|---|---|
| 2011/0238928 A1 | 9/2011 | Abe et al. |
| 2012/0036309 A1 | 2/2012 | Dillow et al. |
| 2012/0066439 A1 | 3/2012 | Fillingim |
| 2014/0029341 A1 | 1/2014 | In |
| 2014/0082276 A1 | 3/2014 | Suzuki et al. |
| 2014/0095819 A1 | 4/2014 | Ono |
| 2014/0101371 A1* | 4/2014 | Nguyen ................ G06F 3/0616 711/103 |
| 2014/0365818 A1 | 12/2014 | Durham et al. |
| 2014/0372698 A1 | 12/2014 | Lee et al. |
| 2016/0162219 A1 | 6/2016 | Erez |
| 2017/0177218 A1 | 6/2017 | Kanno |

OTHER PUBLICATIONS

Japanese Office Action dated Oct. 2, 2018 in related Japanese Patent Application No. 2015-249554.

* cited by examiner

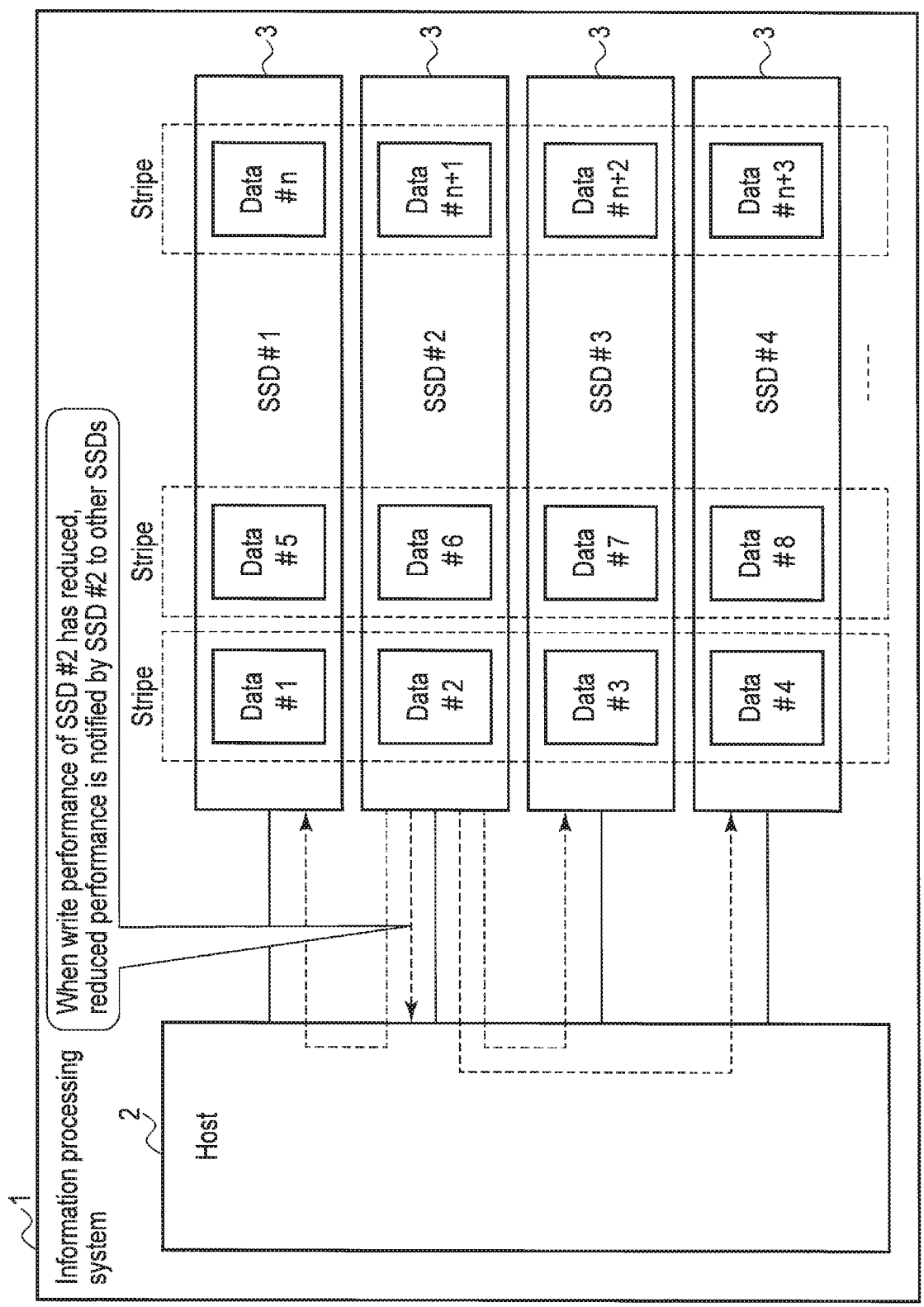
F I G. 1

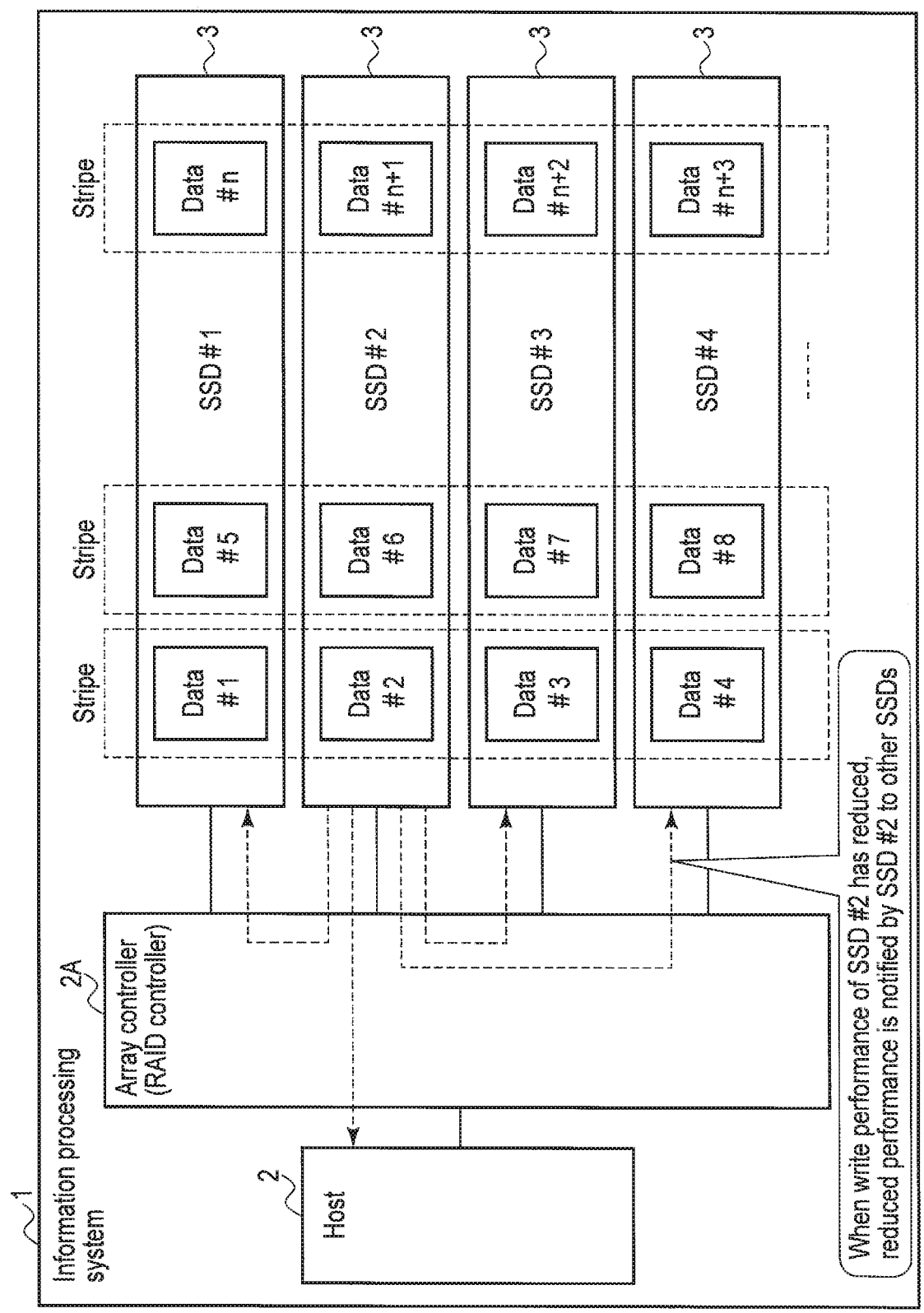
F I G. 2

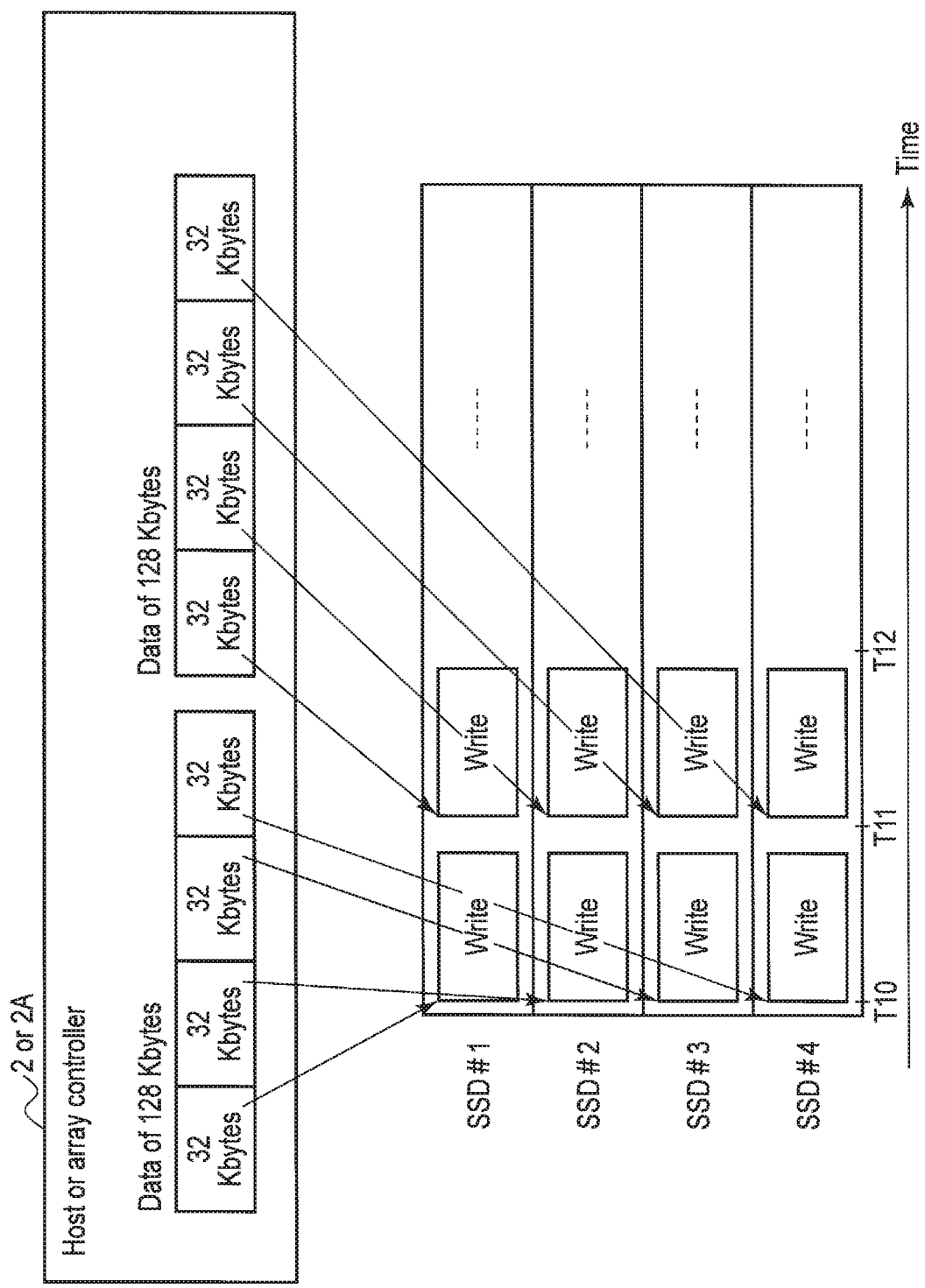
F I G. 3

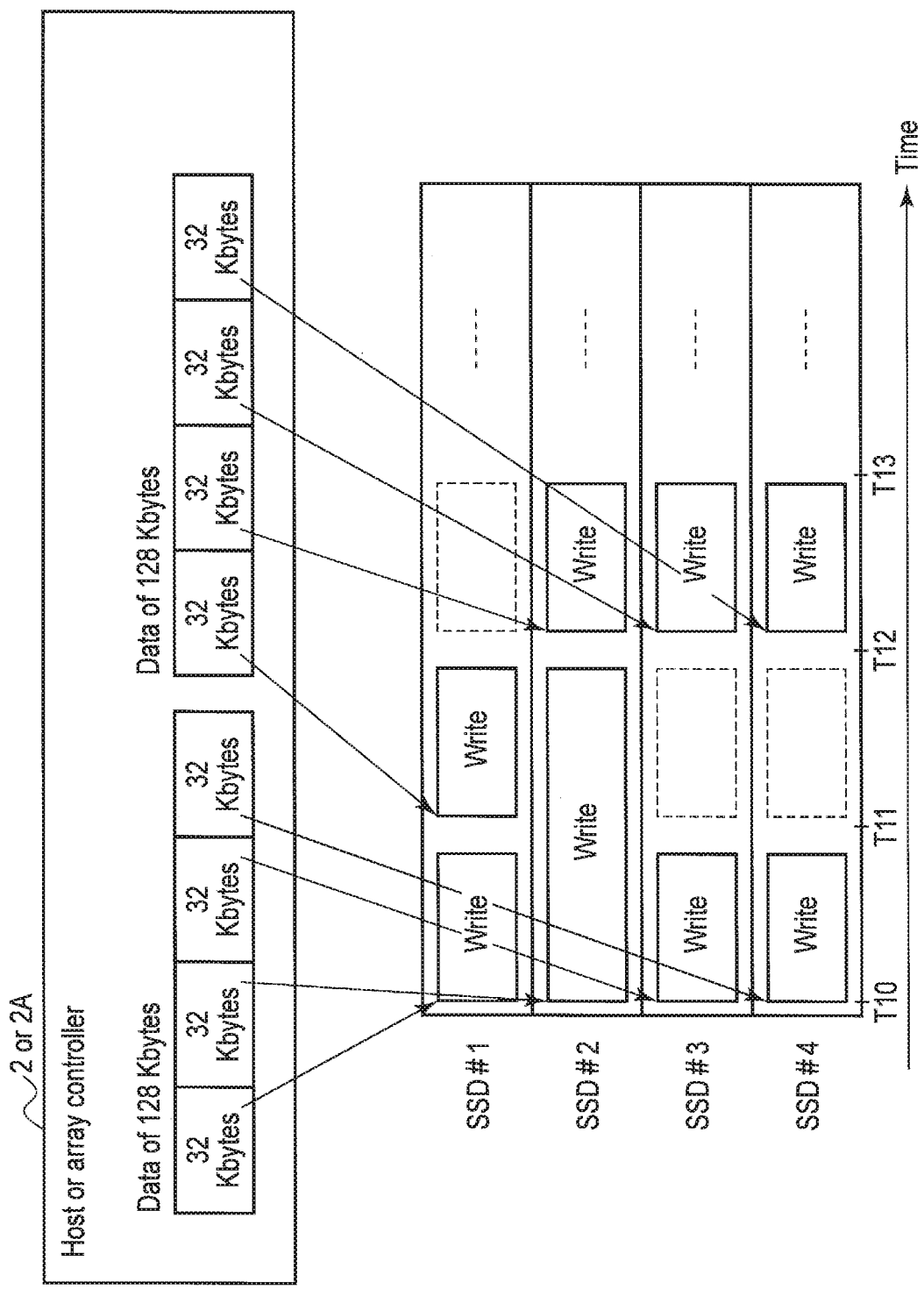
F I G. 4

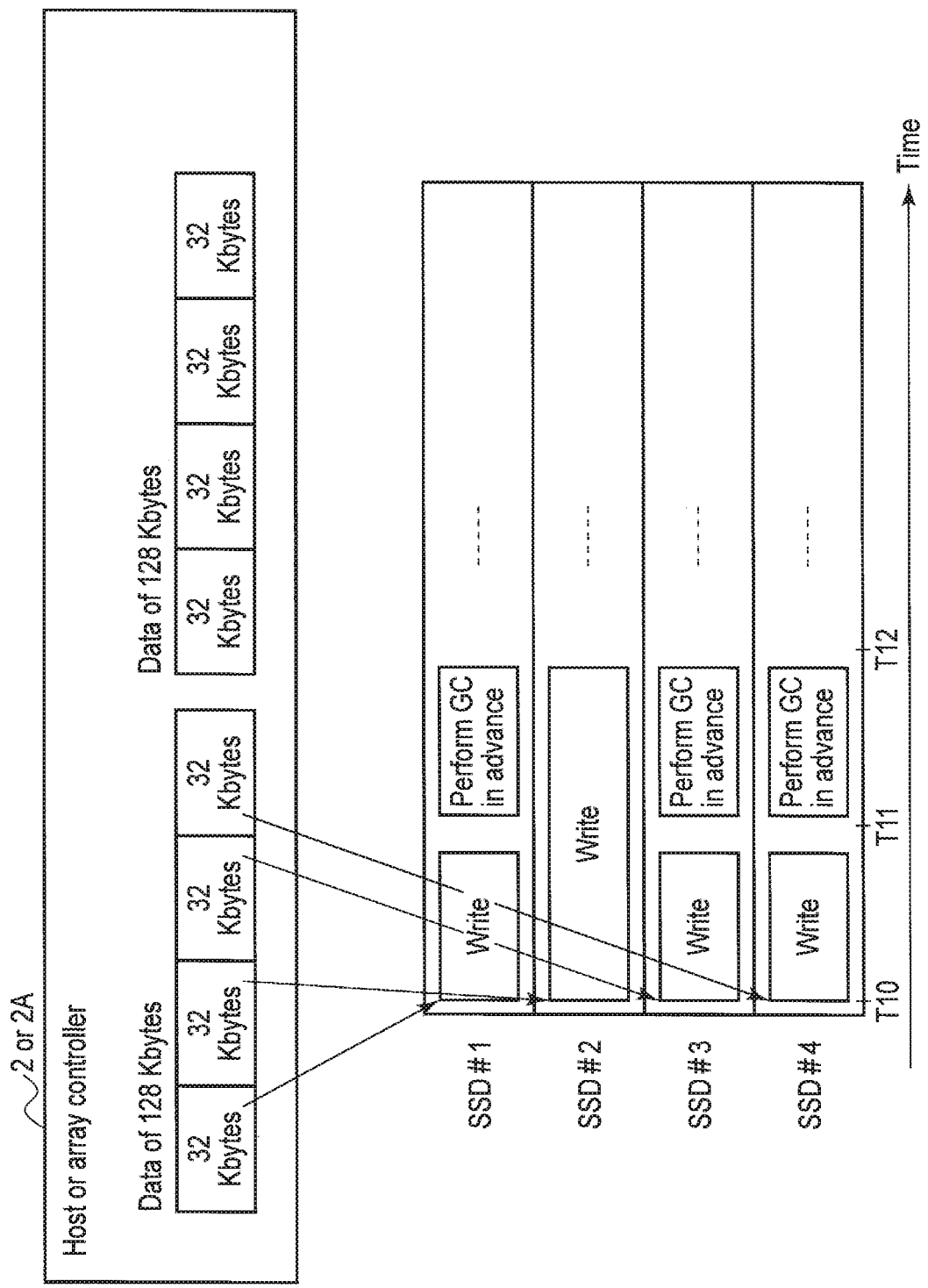
F I G. 5

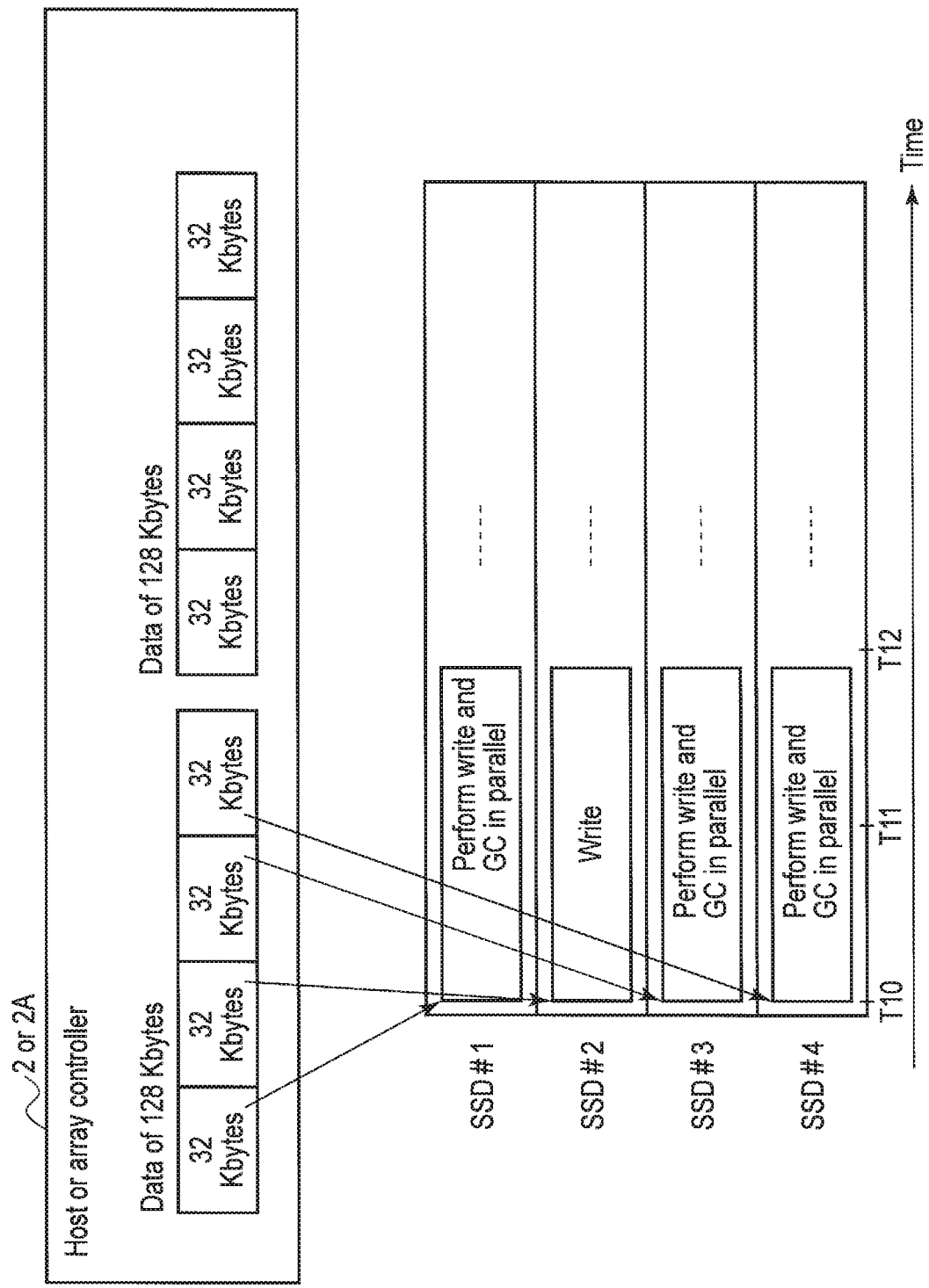
F I G. 6

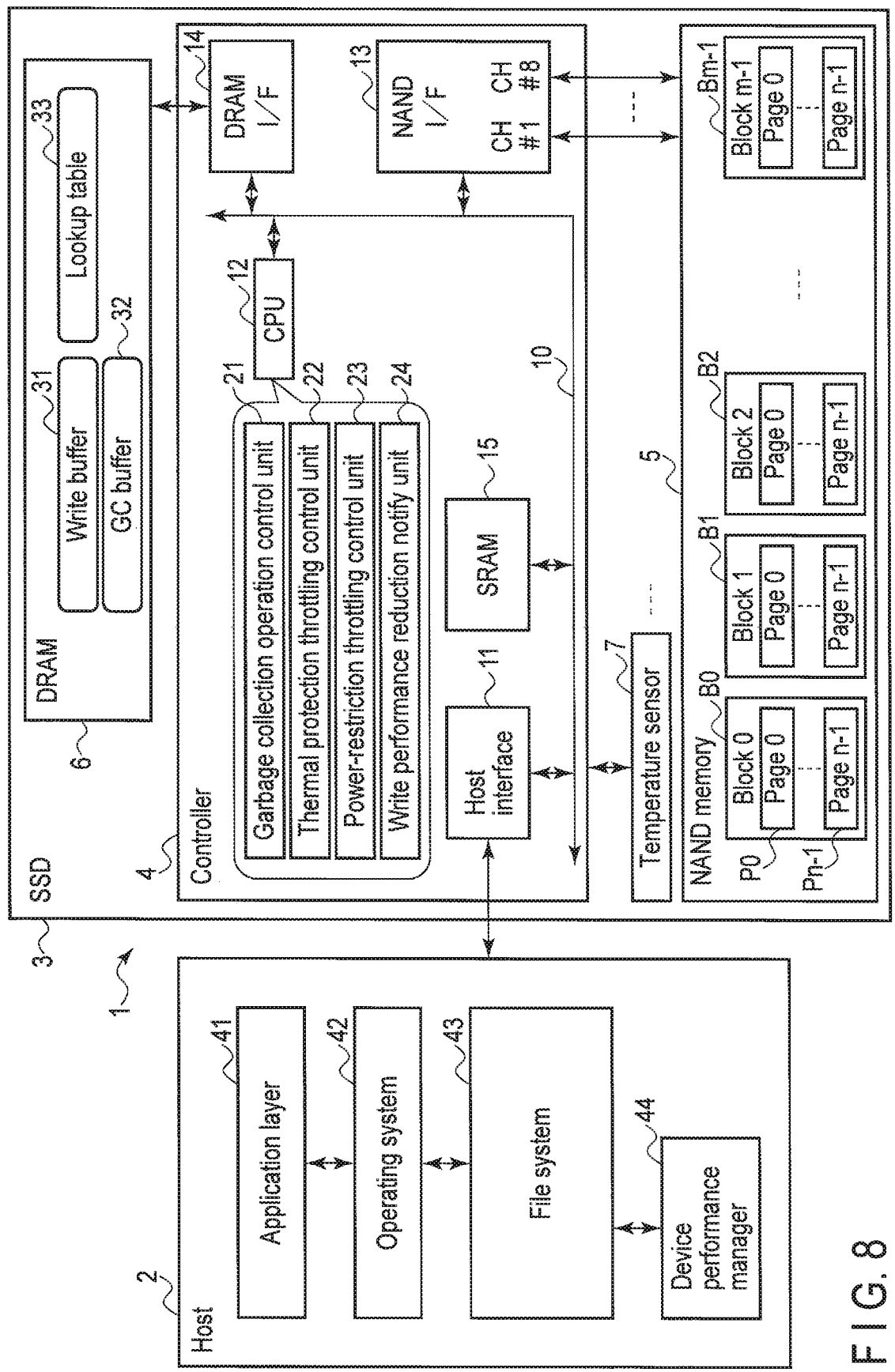
F I G. 8

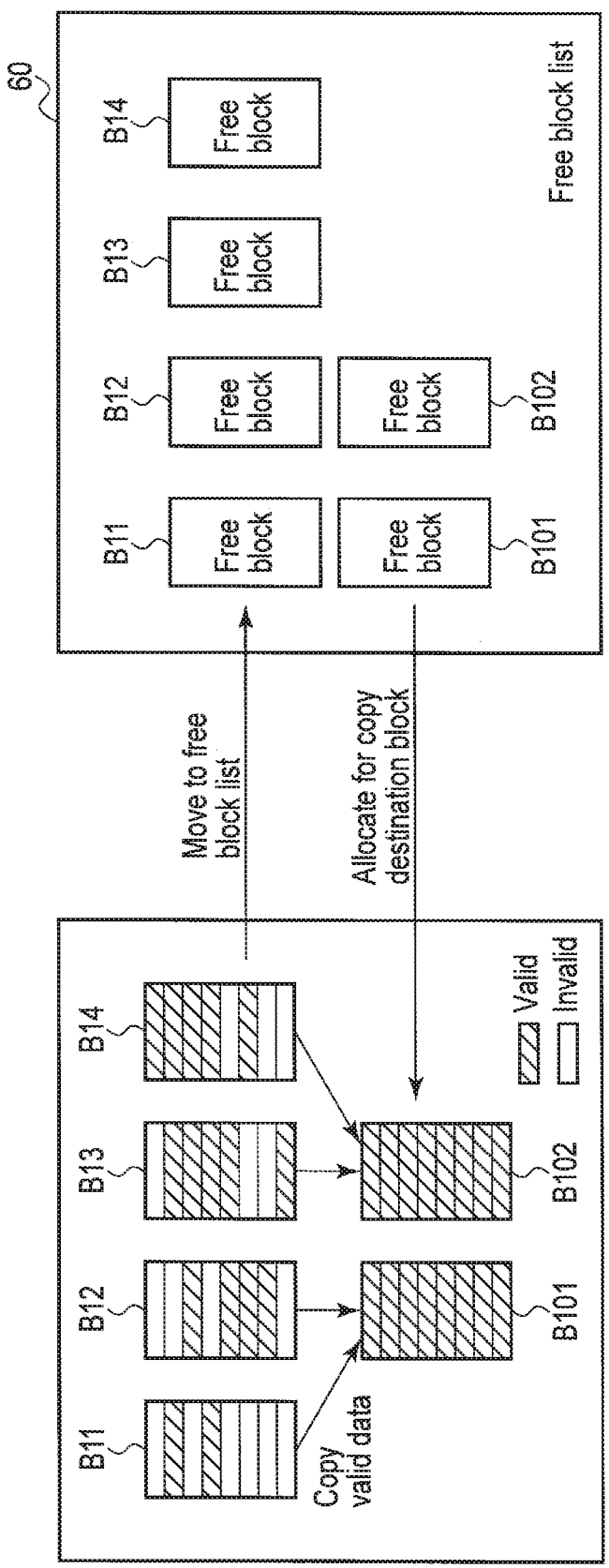
F I G. 10

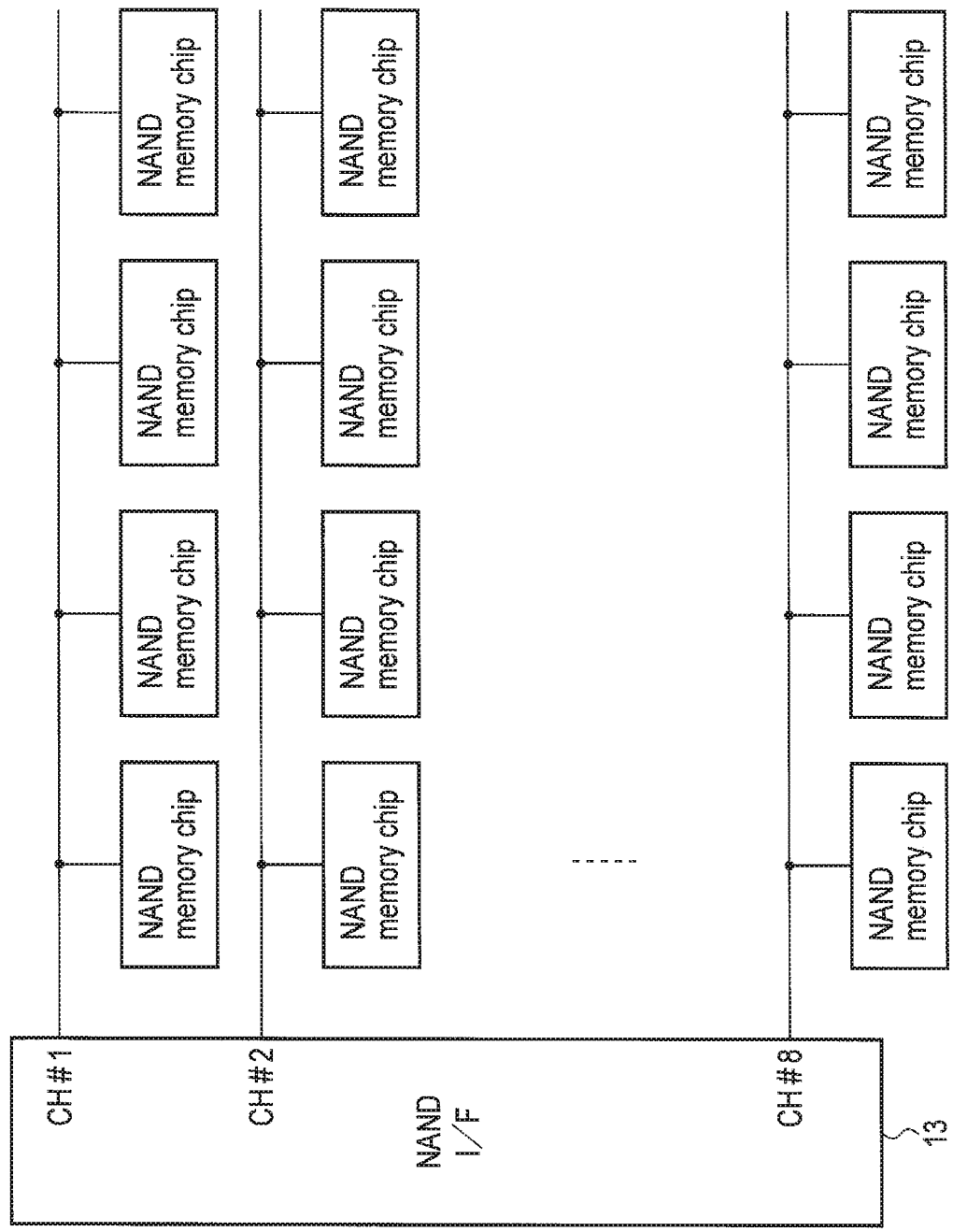
F I G. 11

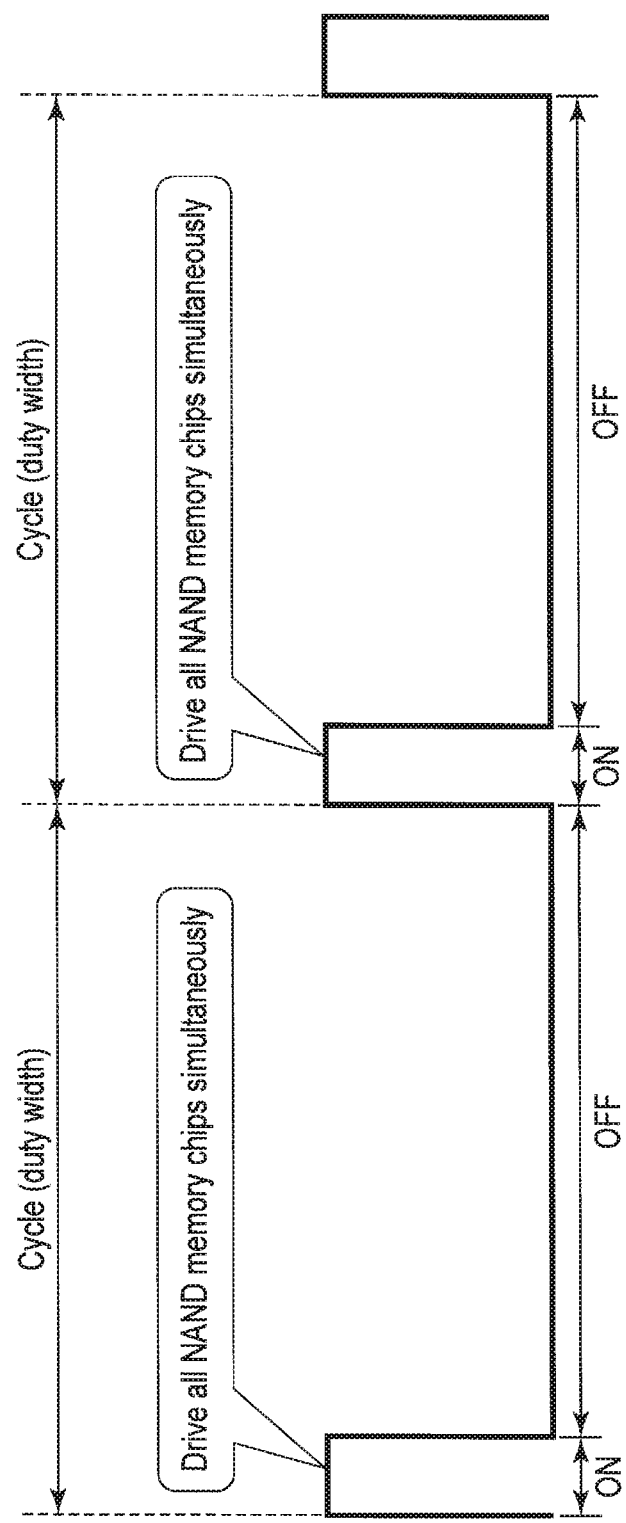
F I G. 12

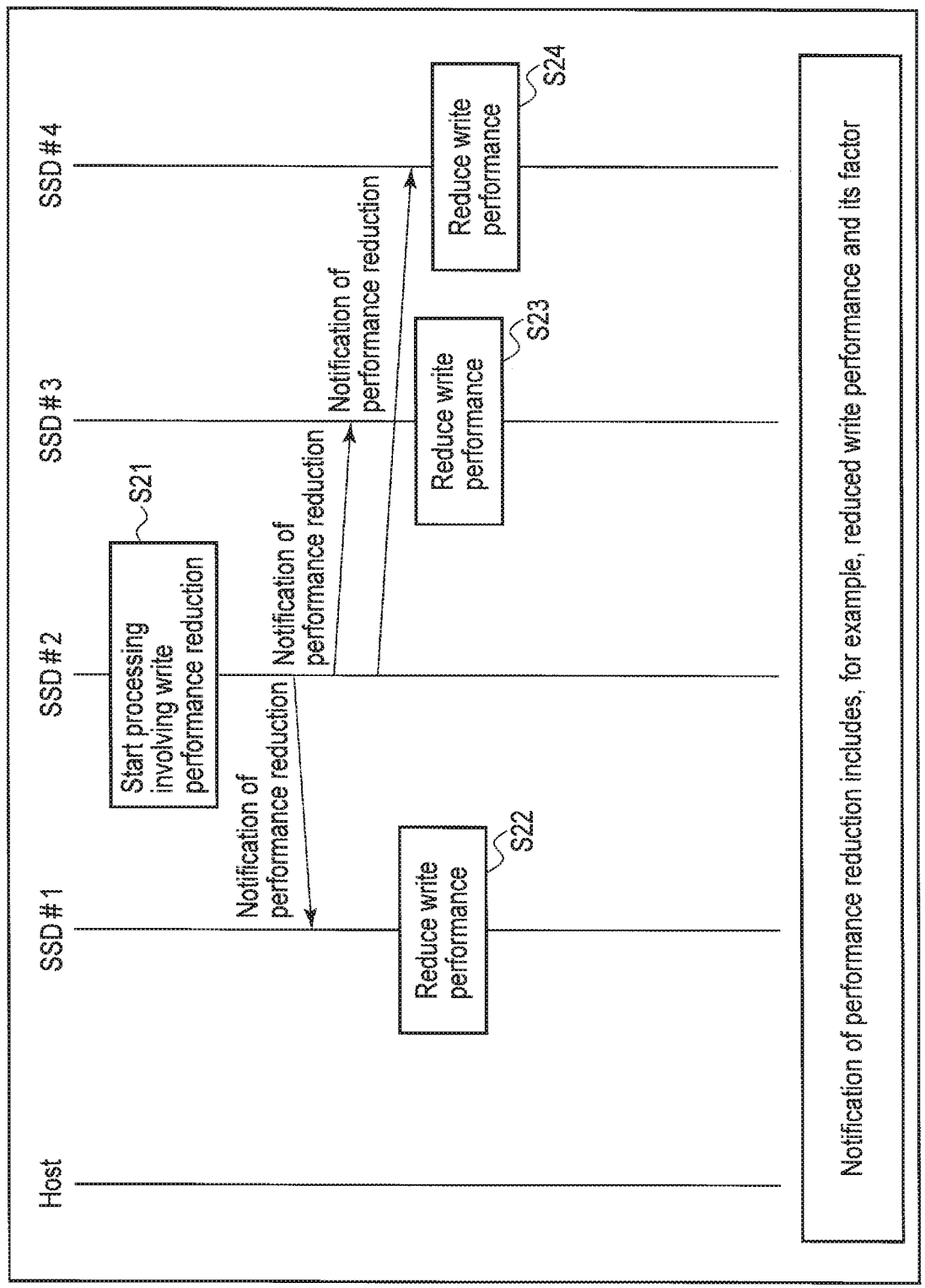
F I G. 14

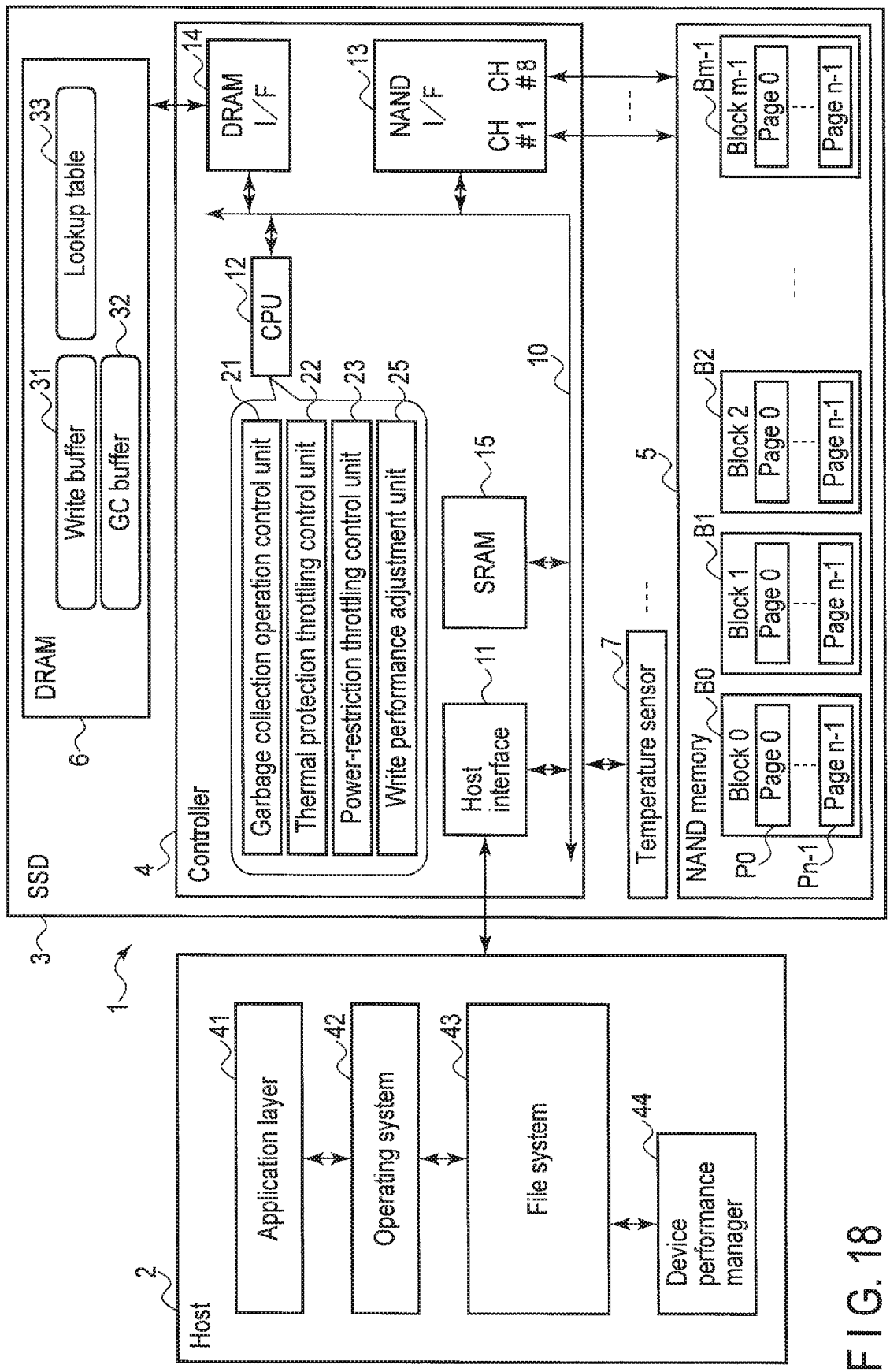
F I G. 18

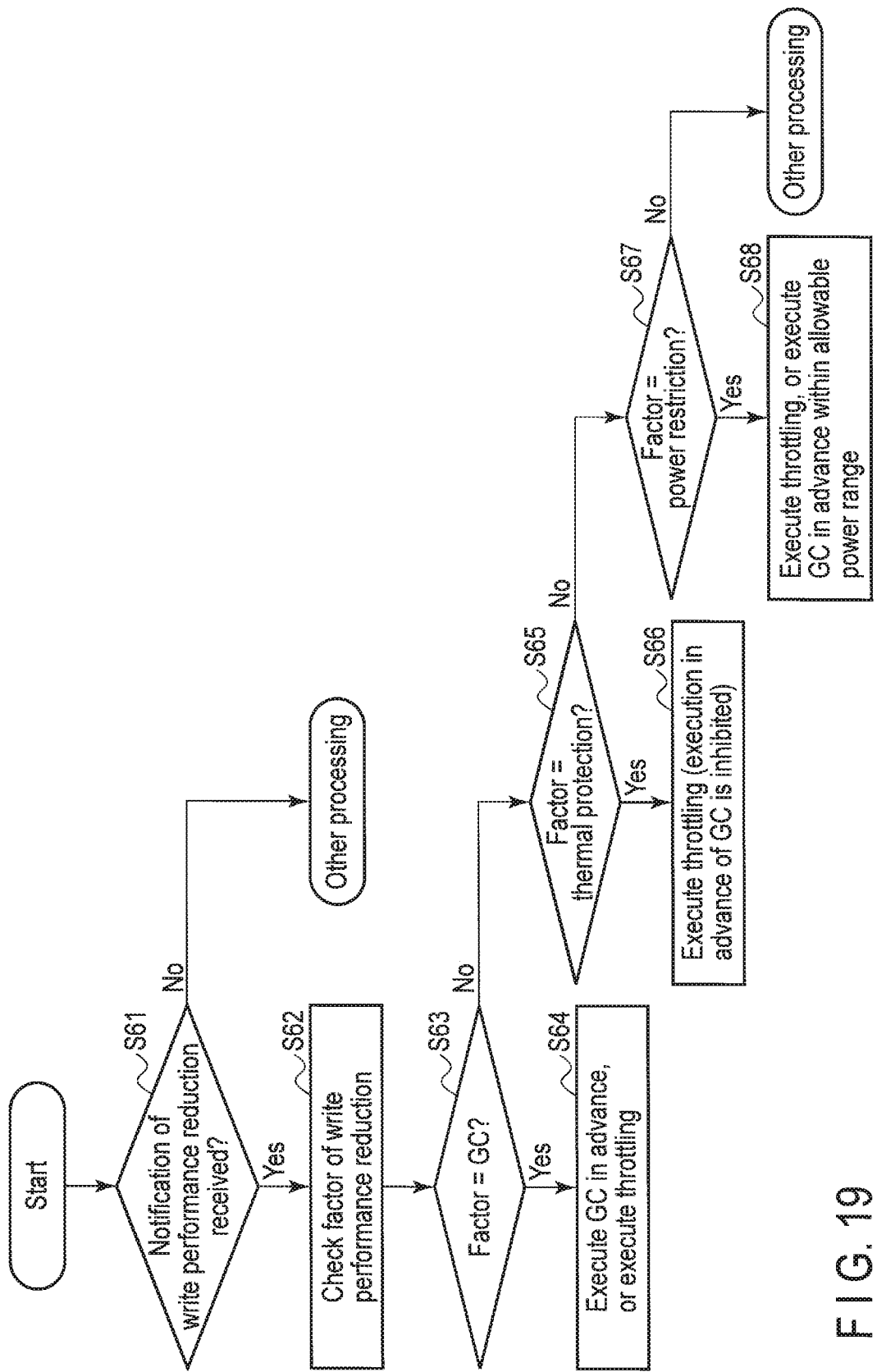
F I G. 19

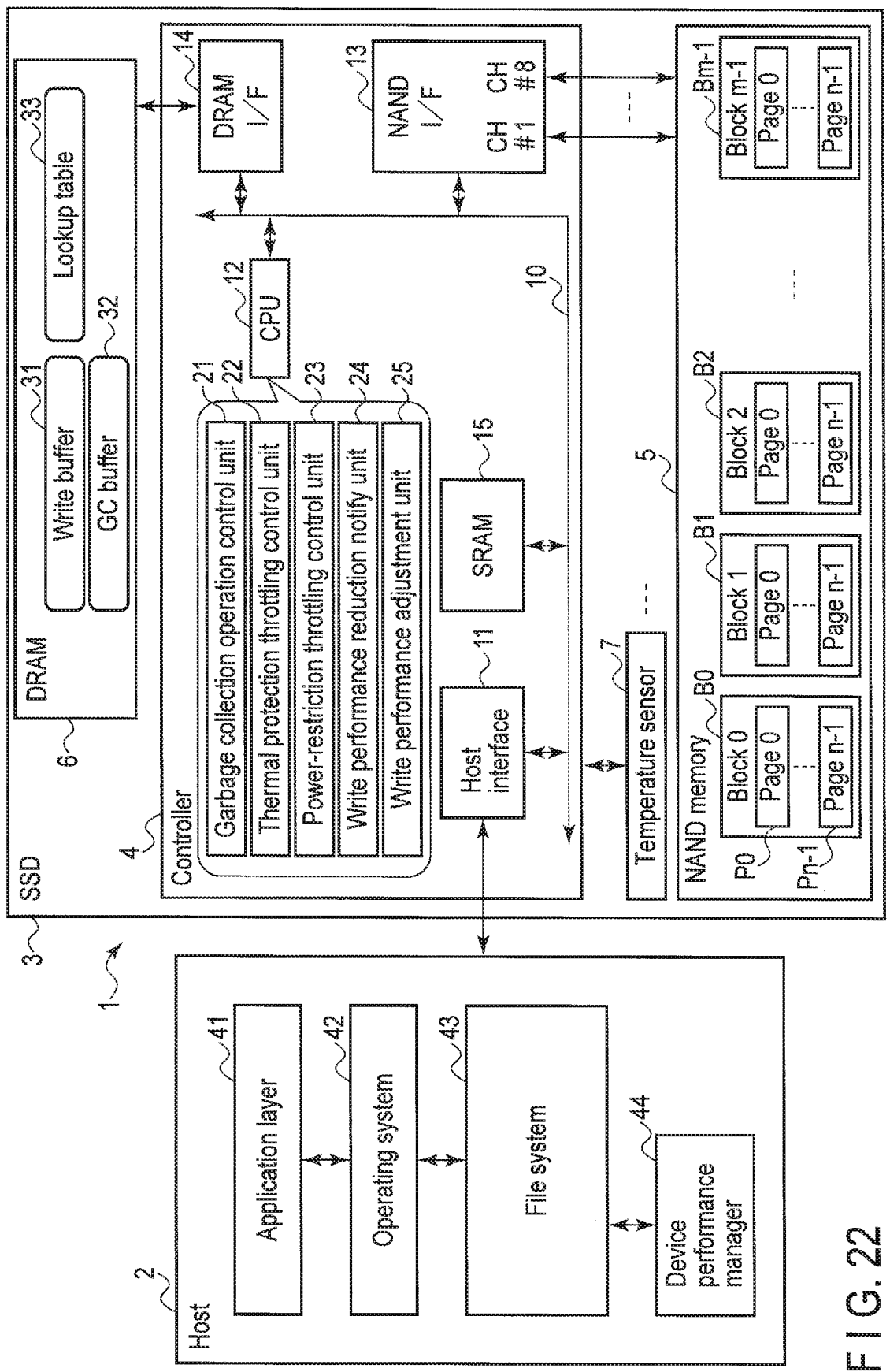
F I G. 22

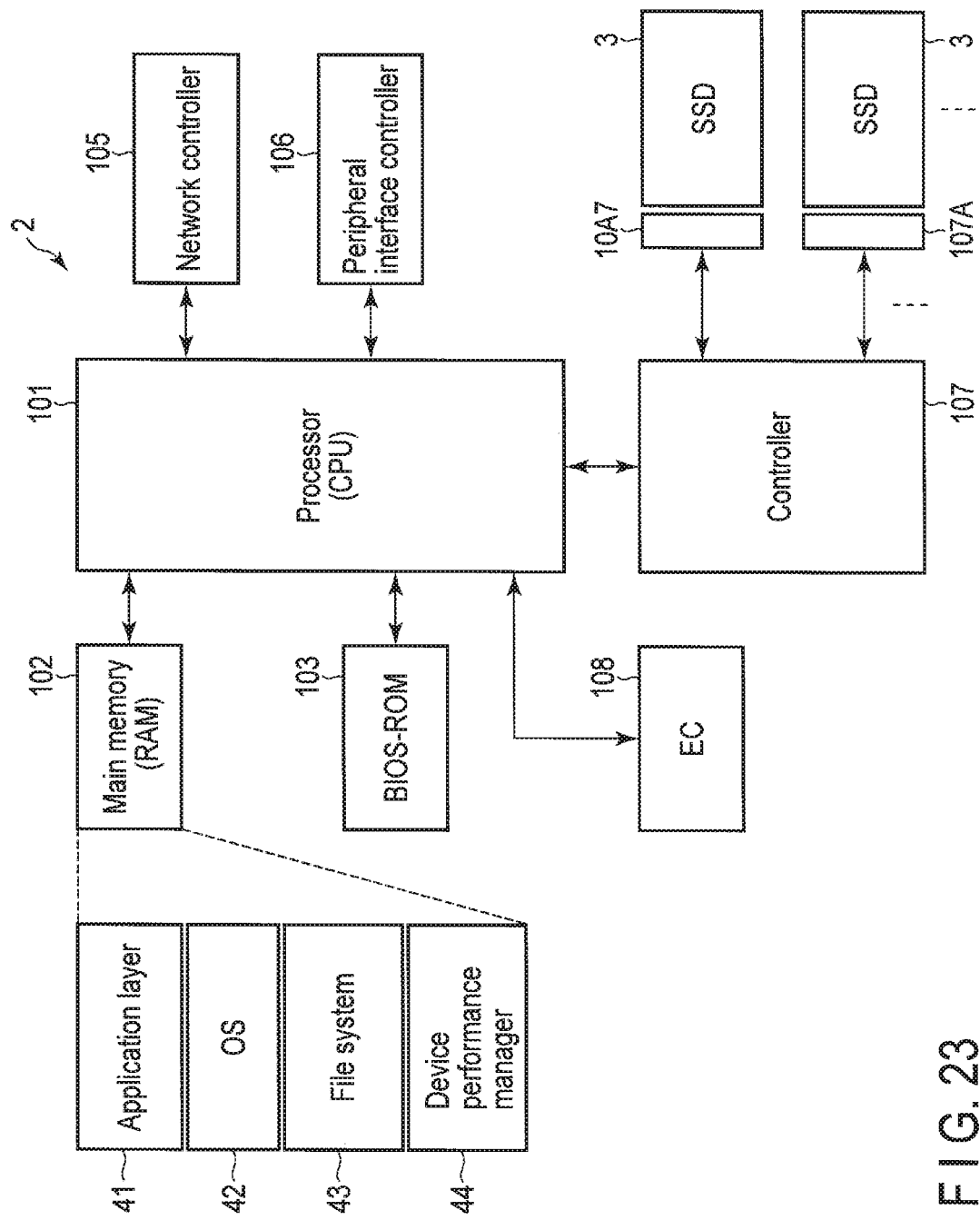
F I G. 23

MEMORY SYSTEM AND METHOD FOR CONTROLLING NONVOLATILE MEMORY

CROSS-REFERENCE TO RELATED APPLICATIONS

This application is a continuation of U.S. patent application Ser. No. 15/209,579, filed on Jul. 13, 2016, which claims the benefit of priority from Japanese Patent Application No. 2015-249553, filed Dec. 22, 2015, the entire contents of each of which are incorporated herein by reference.

FIELD

Embodiments described herein relate generally to technology for controlling a nonvolatile memory.

BACKGROUND

Recently, memory systems comprising nonvolatile memories have become widespread.

As one of these memory systems, a NAND flash solid state drive (SSD) is known.

Because of their low-power consumption and high-performance, SSDs are used as the main storage of various computers.

Further, an array technique utilizing a plurality of SSDs has also been developed in order to obtain higher performance and larger capacity.

BRIEF DESCRIPTION OF THE DRAWINGS

FIG. 1 is a block diagram for illustrating a configuration example of an information processing system including a storage array, to which a memory system according to an embodiment is applied.

FIG. 2 is a block diagram for illustrating another configuration example of the information processing system including the storage array, to which the memory system according to the embodiment is applied.

FIG. 3 is a view for illustrating a write operation example of the storage array.

FIG. 4 is a view for illustrating a write operation of the storage array performed when the write performance of a certain SSD in the storage array is reduced.

FIG. 5 is a view for illustrating a garbage collection (GC) operation performed by other SSDs in the storage array during a period in which the write performance of a certain SSD in the storage array is reduced.

FIG. 6 is a view for illustrating a write operation and a GC operation performed by other SSDs in the storage array during a period in which the write performance of a certain SSD in the storage array is reduced.

FIG. 8 is a block diagram for illustrating a configuration example of a memory system functioning as a sending-side SSD.

FIG. 10 is a block diagram for illustrating a garbage collection operation performed by the memory system functioning as the sending-side SSD.

FIG. 11 is a view for illustrating the relationship between NAND memory chips and a NAND interface which are included in the memory system functioning as the sending-side SSD.

FIG. 12 is a view for illustrating a duty-ratio control operation performed by the memory system functioning as the sending-side SSD.

FIG. 14 is a view for illustrating another example of performance reduction notification processing performed by the memory system functioning as the sending-side SSD.

FIG. 18 is a block diagram for illustrating a configuration example of a memory system functioning as a receiver-side SSD.

FIG. 19 is a flowchart for illustrating a procedure of write performance reduction processing performed by the memory system functioning as the receiver-side SSD when a performance reduction notification has been received.

FIG. 22 is a block diagram for illustrating a configuration example of a memory system having both a function as a sending-side SSD and a function as a receiver-side SSD.

FIG. 23 is a block diagram illustrating a configuration example of a host.

DETAILED DESCRIPTION

Figure 7:
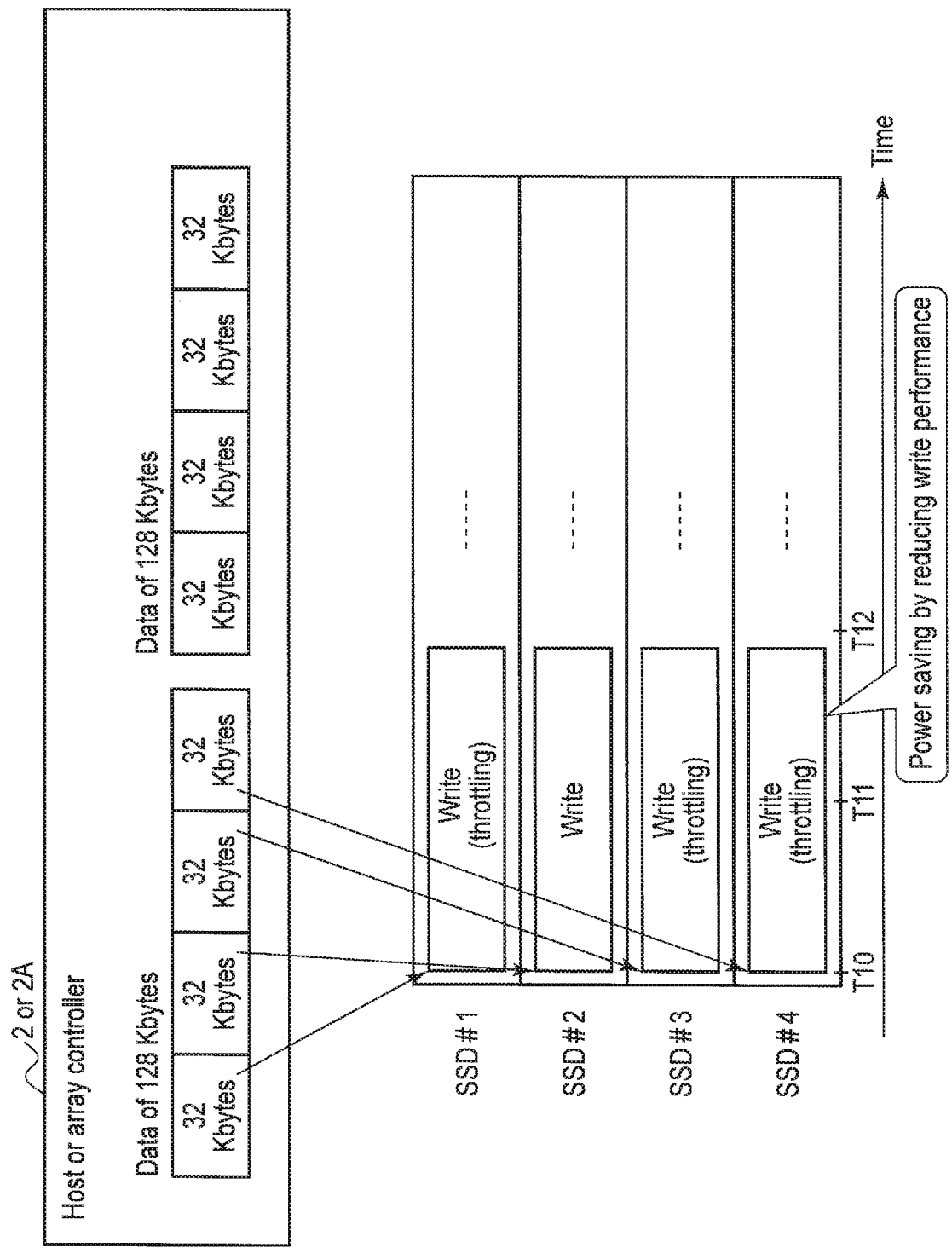
FIG. 7 is a view for illustrating a throttling operation performed by other SSDs in the storage array during a period in which the write performance of a certain SSD in the storage array is reduced.

Various embodiments will be described hereinafter with reference to the accompanying drawings.

In general, according to one embodiment, a memory system is configured to operate as one of semiconductor storage devices in a storage array in which data is distributed across the semiconductor storage devices. The memory system includes a nonvolatile memory and a controller electrically connected to the nonvolatile memory. The controller executes a write operation of writing data, received from a host, to the nonvolatile memory, and an internal operation for managing the memory system.

When starting the internal operation, the controller estimates a value related to an amount of reduction in performance of the write operation due to the start of the internal operation, based on content of the started internal operation. The controller notifies the host or one or more other semiconductor storage devices of the estimated value related to the amount of reduction in the performance of the write operation.

Referring first to FIG. 1, a configuration of an information processing system 1 comprising the memory system according to one embodiment is described.

This memory system is a semiconductor storage device configured to write data to a nonvolatile memory, and to read data from the nonvolatile memory. For instance, the memory system may be realized as a solid state drive (SSD) 3 including NAND flash memories.

The information processing system 1 comprises a host (host device) 2 and a storage array (SSD array). The SSD array includes plural semiconductor storage devices (SSDs). The SSD array is configured to distribute data across SSDs. The SSD array may be realized by a RAID array, such as RAID level 0, RAID level 5 or RAID level 6.

The SSD 3 of the embodiment can function as one semiconductor storage device (SSD) in the SSD array. Only one SSD in the SSD array may be realized by the SSD 3 of the embodiment, or all SSDs in the SSD array may be each realized by the SSD 3 of the embodiment. FIG. 1 shows an example case where all SSDs in the SSD array are each realized by the SSD 3 of the embodiment.

In this SSD array, data is distributed across SSDs by striping. The data to be written to the SSD array by the host 2 may be divided into a plurality of data blocks each having a certain size, and these data blocks may be distributed across the SSDs 3 by striping.

If the SSD array is realized by RAID level 5 or 6, data with a parity block is distributed across the SSDs 3 by striping.

A description will be mainly given of a case where the SSD is a RAID array corresponding to RAID level 0 (striping), although the SSD is not limited to it.

In FIG. 1, a case where the SSD array comprises four SSDs 3 (SSD #1, SSD #2, SSD #3, SSD #4) is assumed.

The data to be written by the host 2 to the SSD array may be divided into four data blocks Data #1, Data #2, Data #3 and Data #4. These data blocks Data #1, Data #2, Data #3 and Data #4 may be transmitted from the host 2 to SSD #1, SSD #2, SSD #3 and SSD #4, respectively. SSD #1, SSD #2, SSD #3 and SSD #4 may simultaneously write data blocks Data #1, Data #2, Data #3 and Data #4, respectively. Data blocks Data #1, Data #2, Data #3 and Data #4 constitute one stripe.

After four data blocks Data #1, Data #2, Data #3 and Data #4 are written, subsequent four data blocks Data #5, Data #6, Data #7 and Data #8 may be transmitted from the host 2 to SSD #1, SSD #2, SSD #3 and SSD #4, respectively. SSD #1, SSD #2, SSD #3 and SSD #4 may simultaneously write data blocks Data #5, Data #6, Data #7 and Data #8, respectively.

The host 2 is an information processing apparatus, such as a server or a personal computer. Each SSD 3 in the SSD array may be built in the information processing apparatus, or may be connected to the information processing apparatus through a cable or a network.

As an interface for interconnecting the host 2 and each SSD 3, SCSI, Serial Attached SCSI (SAS), ATA, Serial ATA (SATA), PCI Express (PCIe), etc., can be used.

To efficiently operate the SSD array, it is desirable to make the SSDs to cooperate with each other. To this end, there is a demand for realization of a new mechanism for providing useful data necessary for the cooperative operation.

The SSD 3 of the embodiment may function as either sending-side SSD or the receiving-side SSD. The sending-side SSD means an SSD having a function of notifying the host 2 or the other SSDs in the SSD array of a value related to an amount of reduction in the write performance of the sending-side SSD itself. The receiving-side SSD means an SSD having a function of receiving from the sending-side SSD or the host 2, data indicating a value related to an amount of reduction in the write performance of the sending-side SSD, and a function of reducing its own write performance in accordance with the value related to the amount of reduction in the write performance of the sending-side SSD.

The write performance of the SSD 3 may fall because of an internal operation for managing the SSD 3. Typical internal operations include a garbage collection operation, a thermal protection operation (such as thermal throttling) for preventing excessive heating of the SSD 3, a power restriction operation (such as power restriction throttling) for suppressing the power consumption of the SSD 3 equal to or less than a maximum power allowed to the SSD 3.

The write performance of the SSD 3 means the performance of a write operation of writing data from the host 2 to a nonvolatile memory in the SSD 3. This write performance may be expressed in terms of write throughput. The write throughput is an amount of data that can be transmitted per unit time from the host 2 to the SSD 3, i.e., a data transfer rate.

Assume here a case where SSD #2 functions as the sending-side SSD.

When it is assumed that the write performance (write throughput) of SSD #2 has been reduced by the start of an internal operation of SSD #2, SSD #2 estimates a value related to an amount of reduction in the write performance of SSD #2 based on the content of the internal operation, and notifies the host 2 or the other SSDs in the SSD array of the estimated value related to the amount of reduction in the write performance. The estimated value may be a reduced write performance after start of the internal operation, or an amount itself of reduction in the write performance. For instance, if it is estimated that the write performance of SSD #2 has been reduced from normal write performance (of, for example, a transfer rate of 1 Gbyte/s) assumed when no internal operation is performed, to a transfer rate of 512 Mbytes/s), SSD #2 may notify the host 2 or the other SSDs in the SSD array that the write performance of SSD #2 has reduced to 512 Mbytes/s, in order to set all SSDs of the SSD array to 512 Mbytes/s.

Each SSD notified of the above by the host 2 or the sending-side SSD can reduce its write performance based on the notified value (write performance reduction amount).

For example, each SSD having received this notification may perform control for reducing its own write performance to the reduced write performance (in this case, 512 Mbytes/s) designated by the notification. If, for example, each SSD having received the notification has a write performance of 1 Gbyte/s, it may reduce its own write performance (write rate) to 512 Mbytes/s, thereby reducing its consumption of energy. Alternatively, each SSD may reduce its own write performance to 512 Mbytes/s, and may perform a garbage collection operation in advance, using the remaining write performance (in this case, 512 Mbytes/s).

Thus, the notification function of the sending-side SSD enables effective use of its write performance reduced period for reducing the power consumption of the other SSDs or for causing the other SSDs to perform a garbage collection operation in advance.

As a method of notifying the host 2 of a value related to an amount of reduction in the write performance of the sending-side SSD, an arbitrary method that enables the sending-side SSD to notify the host 2 of its write performance reduction amount can be used. For example, when starting an internal operation, the sending-side SSD may transmit an interrupt signal to the host 2, thereby notifying the host 2 of the write performance reduction amount of the sending-side SSD. If the host 2 has a function of periodically reading the internal register of the sending-side SSD, the sending-side SSD may set its write performance reduction amount in the internal register.

Upon receiving data indicating the write performance reduction amount from the sending-side SSD, the host 2 may notify each SSD in the SSD array of the write performance reduction amount. Alternatively, upon receiving data indicating the write performance reduction amount from the sending-side SSD, the host 2 may execute control for reducing the write performance of the other SSDs in the SSD array, based on the notified write performance reduction amount.

The value related to an amount of reduction in the write performance of the sending-side SSD may be directly notified to the other SSDs of the SSD array, without using the host 2 (host CPU). As a method for this type notification, an arbitrary method that enables direct communication between SSDs without the host 2 can be used. For example, when each SSD in the SSD array is electrically connected to the host 2 through a PCI Express (PCIe) bus, communication (end-to-end communication) between the sending-side SSD and each of the other SSDs may be performed through a bus switch for connecting PCIe buses.

Further, in a case where an array configuration wherein each SSD is electrically connected to the host 2 through an array controller (for example, a RAID controller) 2A as shown in FIG. 2 is used, communication between the sending-side SSD and each of the other SSDs may be performed through the array controller 2A.

The array controller 2A performs control for distributing, across the SSDs by striping, write data received from the host 2. The array controller 2A may be realized by a RAID controller.

FIG. 3 shows an example of a write operation of the SSD array.

Assume here that the SSD array includes four SSDs SSD #1 to SSD #4.

The host 2 or the array controller 2A may divide data of a particular size (for example, 128K bytes) into four data blocks (each block has a size of 32 Kbytes), and may cause SSD #1 to SSD #4 to write the four data blocks in a parallel way.

For example, the host 2 or the array controller 2A transmits write commands and data blocks to the four SSDs 3 at time T10. In this case, the first data block of 32 Kbytes included in data of 128 Kbytes is transmitted as write data to SSD #1. The second data block of 32 Kbytes included in the data of 128 Kbytes is transmitted as write data to SSD #2. The third data block of 32 Kbytes included in the data of 128 Kbytes is transmitted as write data to SSD #3. The last data block of 32 Kbytes included in the data of 128 Kbytes is transmitted as write data to SSD #4.

SSD #1 to SSD #4 write the received data blocks to the respective nonvolatile memories in SSD #1 to SSD #4. After SSD #1 to SSD #4 complete data writing, the host 2 or the array controller 2A sequentially transmits, at time T11, write commands and data blocks included in subsequent data of 128K bytes. In this case, a first block of 32 Kbytes included in the subsequent data of 128 Kbytes is transmitted as write data to SSD #1. A second block of 32 Kbytes included in the subsequent data of 128 Kbytes is transmitted as write data to SSD #2. A third block of 32 Kbytes included in the subsequent data of 128 Kbytes is transmitted as write data to SSD #3. A last block of 32 Kbytes included in the subsequent data of 128 Kbytes is transmitted as write data to SSD #4.

FIG. 4 shows examples of write operations performed in the SSD array when a certain SSD in the SSD array has reduced in write performance.

In FIG. 4, a case where the write operation of SSD #2 is not completed at scheduled time T11 because of a reduction in the write performance of SSD #2 is assumed.

At time T11, the host 2 or the array controller 2A can transmit, to SSD #1, the first data block of the subsequent data of 128K bytes.

However, since SSD #2 is in a busy state in which a write operation is progressing, it cannot start a subsequent write operation. In this case, transmission of a subsequent data block from the host 2 or the array controller 2A to SSD #2 may be stalled until the current write operation of SSD #2 is completed. Since thus, SSD #2 may become a bottleneck, transmission of data blocks from the host 2 or the array controller 2A to SSD #3 and SSD #4 may be also stalled.

After SSD #2 completes the data write operation, the host 2 or the array controller 2A sequentially transmits, to SSD #2, SSD #3 and SSD #4, write commands and data blocks in the subsequent data of 128 Kbyte. The second data block of 32 Kbytes included in the subsequent data of 128 Kbytes is transmitted as write data to SSD #2. The third data block of 32 Kbytes included in the subsequent data of 128 Kbytes is transmitted as write data to SSD #3. The last data block of 32 Kbytes included in the subsequent data of 128 Kbytes is transmitted as write data to SSD #4.

Therefore, during a period between times T11 and T12, SSD #3 and SSD #4 may be maintained in an idle state with no work loads to be executed.

Transmission of a subsequent data block from the host 2 or the array controller 2A to SSD #1 may be stalled until the write operation of SSD #4 is completed. Therefore, SSD #1 may be maintained in an idle state during a period between times T12 and T13.

Thus, the write performance for writing data from the host 2 (i.e., the write performance of the SSD array) may be limited by the reduced write performance of SSD #2.

FIG. 5 shows a garbage collection (GC) operation performed by other SSDs in the SSD array during a period in which the write performance of SSD #2 is reduced.

As described above, SSD #2 can function as the sending-side SSD. Therefore, when the write performance of SSD #2 has reduced, SSD #2 can notify the host 2 or the other SSDs in the SSD array of a value related to an amount of reduction in the write performance of SSD #2.

This enables, for example, each of SSD #1, SSD #3 and SSD #4 to perform a garbage collection (GC) operation in advance during the period between times T11 and T12 in which the SSD #1, SSD #3 and SSD #4 waiting for the completion of the write operation of SSD #2.

The execution of a garbage collection (GC) operation in advance means starting of a garbage collection (GC) operation before the number of remaining free blocks is less than or equal to a threshold at which the garbage collection (GC) operation should be started. Since thus, the number of free blocks in each of SSD #1, SSD #3 and SSD #4 can be increased early, SSD #1, SSD #3 and SSD #4 can delay the start time of a subsequent GC operation. Accordingly, the time of write performance reduction of each of SSD #1, SSD #3 and SSD #4 due to the start of the garbage collection (GC) operation can be delayed.

FIG. 6 shows write operations and garbage collection (GC) operations performed by other SSDs in the SSD array during a period in which the write performance of SSD #2 is reduced.

FIG. 5 is directed to the case where each of SSD #1, SSD #3 and SSD #4 performs a garbage collection (GC) operation during the period between times T11 and T12. In contrast, in FIG. 6, each of SSD #1, SSD #3 and SSD #4 performs a write operation of data received from the host 2 and a garbage collection (GC) operation in parallel during the period ranging from time T10 to time T12.

For example, when SSD #1 to SSD #4 are operating at a write performance of 1 Gbyte/s, if the write performance of SSD #2 falls to 512 Mbytes/s, each of SSD #1, SSD #3 and SSD #4 may perform the write operation of writing data from the host 2 and the garbage collection (GC) operation in parallel, by using a write performance of 512 Mbytes/s for the write operation and using the remaining performance of 512 Mbytes/s. for the garbage collection (GC) operation.

FIG. 7 shows throttling operations performed by other SSDs in the SSD array during a period in which the write performance of SSD #2 is reduced.

The throttling operation means an operation of restricting write performance. For instance, an example of the throttling operation is as follows:

(1) The number of nonvolatile memory chips to be simultaneously (in parallel) driven is restricted.

(2) The ratio (duty ratio) of a first period to one cycle that includes the first period in which a plurality of nonvolatile memories are simultaneously (in parallel) driven, and a second period in which a plurality of nonvolatile memories are not driven is restricted.

(3) The number of nonvolatile memories to be simultaneously driven (driven in parallel) is restricted, and the duty ratio is restricted.

In the period ranging from time T10 to time T12, SSD #1, SSD #3 and SSD #4 reduce their write performance to the same level as the reduced write performance of SSD #2 by executing respective throttling operations.

In general, as increasing the write throughput of an SSD, the power consumption of the SSD is increased. Accordingly, by reducing performance of the write operation of each of SSD #1, SSD #3 and SSD #4, the power consumption of them can be reduced.

Thus, in the embodiment, the sending-side SSD transmits, to the host 2 or the other SSDs, a value (e.g., the level of the reduced write performance) corresponding to an amount of reduction in write performance, instead of data indicating, for example, the number of remaining free blocks. As a result, the write performance of each of the other SSDs can be easily reduced to the same level as the reduced write performance of the sending-side SSD, whereby the write performance of all SSDs in the SSD array can be efficiently balanced, without any particular processing by the host 2.

FIG. 8 shows a configuration example of the SSD 3 that functions as the above-mentioned sending-side SSD.

The SSD 3 includes a controller 4 and a nonvolatile memory (NAND memory) 5. The SSD 3 may further include a random-access memory such as a DRAM 6, and a temperature sensor 7. The NAND memory 5 may comprise a plurality of NAND memory chips (nonvolatile memory chips).

The NAND memory 5 includes a large number of NAND blocks (blocks) B0 to Bm-1. Each of blocks B0 to Bm-1 function as the unit of erase. Each block may also be called a physical block or an erase block.

Blocks B0 to Bm-1 each include a large number of pages (physical pages). Specifically, each of blocks B0 to Bm-1 includes pages P0 to Pn-1. In the NAND memory 5, a data read and a data write are performed in units of a page. A data erase is performed in units of a block.

The controller 4 is electrically connected to the NAND memory 5 as a nonvolatile memory through a NAND interface 13, such as a toggle or ONFI. The NAND interface 13 may have a plurality of channels. Each channel is connected to some NAND memory chips. The controller 4 can cause the NAND memory chips connected to the NAND interface 13 to perform write and read operations in parallel.

The controller 4 may function as a flash translation layer (FTL) configured to perform data management and block management of the NAND memory 5.

The data management includes, for example, (1) management of mapping information indicative of the relationship between logical block addresses (LBAs) and physical addresses, and (2) processing of hiding a page-unit read/write operation and a block-unit erase operation. The mapping management between LBAs and physical addresses is performed using a look-up table (LUT) 33 that functions as a logical-to-physical address translation table. The look-up table (LUT) 33 manages mapping between the LBAs and the physical addresses in units of a particular management size. Many of the write commands from the host 2 request a data write of 4 Kbytes. Therefore, the look-up table (LUT) 33 may manage mapping between LBAs and physical addresses in units of, for example, 4 Kbytes. A physical address corresponding to a certain LBA indicates a physical storage location in the NAND memory 5, where the data of this LBA was written. The physical address includes a physical block address and a physical page address. The physical page address is allocated to each of all pages, and the physical block address is allocated to each of all physical blocks.

Data write to the page is possible only once per erase cycle.

Accordingly, the controller 4 maps write (overwrite) to a certain LBA to another page in the NAND memory 5. That is, the controller 4 writes this data to this another page. Further, the controller 4 updates the look-up table (LUT) 33 and associates this LBA with this another page, and also invalidates the original page (the old data with which this LBA has been associated).

The block management includes a bad block management, wear leveling, garbage collection, etc. The wear leveling is an operation of leveling the program/erase cycles (i.e., erase counts) among the physical blocks.

The garbage collection is an operation for creating a free space in the NAND memory 5. The garbage collection operation copies all valid data in several blocks in which the valid data and invalid data are mixed to another block (copy destination free block), in order to increase the number of free blocks in the NAND memory 5. Valid data is newest data associated with a certain LBA. Invalid data is data that is no longer used by the host 2 by updating or erasure, i.e., old data associated with no LBAs. The garbage collection operation updates the look-up table (LUT) 33, thereby associating the LBAs of the copied valid data with respective correct physical addresses. A block, which includes only the invalid data after the valid data has been copied to another block, becomes a free block. Thus, this block can be reused after erasing this block.

The host 2 transmits a write command to the SSD 3. This write command contains the logical address (starting logical address) of write data (namely, data to be written), and the transfer length of the write data. Although in the embodiment, the LBA is used as the logical address, object ID may be used as the logical address in another embodiment. The LBA is expressed by the serial number allocated to a logical sector (logical block). The serial number begins with zero. The size of the logical sector is, for example, 512 bytes.

The controller 4 of the SSD 3 writes write data, which is designated by the starting logical address and transfer length in the write command, to a page of a block in the NAND memory 5. Further, the controller 4 updates the look-up table (LUT) 33, thereby associating the LBA, which corresponds to the written data, with the physical address indicating the physical storage location at which the data was written.

More specifically, the controller 4 allocates one of the free blocks in the NAND memory 5 for writing data from the host 2. The allocated block is a write target block to which the data from the host 2 is to be written, and is also called "a write destination block" or "an input block." While updating the look-up table (LUT) 33, the controller 4 successively writes data, received from the host 2, to available pages in the write target block (write destination block). When the write target block has no more available page, the controller 4 allocates a new free block as a write target block.

Next, a configuration of the controller 4 will be described.

The controller 4 may include a host interface 11, a CPU 12, a NAND interface 13, a DRAM interface 14, an SRAM 15, etc. The CPU 12, the NAND interface 13, the DRAM interface 14 and the SRAM 15 may be connected to each other via a bus 10. The host interface 11 receives various commands (a write command, a read command, an UNMAP command, etc.) from the host 2.

The write command requests the SSD 3 to write data designated by the write command. The write command contains the LBA (starting LBA) of a first logical block to be written, and a transfer length (the number of logical blocks). The read command requests the SSD 3 to read data designated by the read command. The read command contains the LBA (starting LBA) of a first logical block to be read, and a transfer length (the number of logical blocks).

The CPU 12 is a processor configured to control the host interface 11, the NAND interface 13, the DRAM interface 14 and the SRAM 15. In addition to the above-mentioned FTL processing, the CPU 12 performs command processing for processing various commands from the host 2.

For example, upon receiving a write command from the host 2, the controller 4 performs a write operation of writing data designated by the write command to the NAND memory 5 under control of the CPU 12, as described below.

That is, the controller 4 writes data to a physical storage location (available page) in a current write target block, and updates the look-up table (LUT) 33, thereby associating the physical address of the physical storage location with the LBA (starting LBA) included in the write command.

The FTL processing and the command processing may be controlled by firmware executed by the CPU 12. The firmware causes the CPU 12 to function as a garbage collection (GC) operation control unit 21, a thermal protection throttling control unit 22, a power-restriction throttling control unit 23, and a write performance reduction notification unit 24.

The garbage collection operation control unit 21 performs a garbage collection operation of copying valid data in some blocks (fragmented blocks) selected as garbage collection targets to another block (copy destination block). The garbage collection operation is performed, for example, when the number of free blocks in the NAND memory 5 becomes a particular threshold or less. The garbage collection operation consumes the resources of the SSD 3 and degrades the performance of the SSD 3. Therefore, during execution of the garbage collection operation, the performance of the write operation to write data received from the host 2 to a write target block (i.e., write performance) may be degraded.

The thermal protection throttling control unit 22 performs a thermal protection operation (thermal throttling operation) for preventing overheating of the SSD 3 based on a temperature detected by the temperature sensor 7. The thermal throttling operation is realized by restricting the write performance of the SSD 3. More specifically, based on the temperature detected by the temperature sensor 7, the thermal protection throttling control unit 22 restricts the number of NAND memory chips simultaneously driven (driven in parallel), or restricts the ratio of a first period in which a plurality of NAND memory chips are simultaneously driven, to one cycle that includes the first period and a second period in which the NAND memory chips are not driven.

The power-restriction throttling control unit 23 performs a power restriction operation (power-restriction throttling operation) of restricting the power consumption (energy consumption) of the SSD 3 to or less than maximum power allowable to the SSD 3. The maximum power allowable to the SSD 3 may be beforehand notified to the SSD 3 by the host 2. The maximum power indicates a maximum power consumption allowed to the SSD 3.

The power-restriction throttling operation can also be performed by restricting the write performance of the SSD 3. More specifically, based on the maximum power allowed to the SSD 3 and the power consumption of each NAND memory chip, the power-restriction throttling control unit 23 restricts the number of NAND memory chips to be simultaneously driven (driven in parallel) or restricts the ratio of a first period in which the NAND memory chips are simultaneously driven (driven in parallel), to one cycle that includes the first period and a second period in which the NAND memory chips are not driven.

When an internal operation (the garbage collection operation, the thermal throttling operation or the power-restriction throttling operation) is started, the write performance reduction notification unit 24 estimates a value related to an amount of reduction in the write performance of the sending-side SSD due to the start of the internal operation, based on content of the started internal operation. Then, the write performance reduction notification unit 24 notifies the host 2 or one or more of the other SSDs in the SSD array of the estimated value related to the amount of reduction in the write performance.

The estimated value may be a reduced write performance, i.e., performance obtained after the performance of the write operation has reduced because of start of the internal operation. In this case, if, for example, the write performance has reduced from 1 Gbyte/s to 500 Mbytes/s, 500 Mbytes/s may be estimated as the value related to the amount of reduction in the write performance.

Alternatively, the value related to the amount of reduction in the write performance may be the amount itself of reduction in the write performance, namely, a value obtained by subtracting the reduced write performance from a normal write performance. The normal write performance is a write performance before start of the internal operation. In this case, if, for example, the write performance has reduced from 1 Gbyte/s to 500 Mbytes/s, 524 Mbytes/s (=1024−500) may be estimated the value related to the amount of reduction in the write performance.

When the write performance has been recovered by the end of the internal operation, the write performance reduction notification unit 24 may notify the host 2 or one or more of the other SSDs in the SSD array that the write performance has been recovered to the normal write performance (e.g., 1 Gbyte/s).

Next, other components in the controller 4 will be described.

The NAND interface 13 is a NAND controller configured to control the NAND memory 5 under control of the CPU 12. The NAND interface 13 may be of multichannel, for example, may include eight channels (CH #1 to CH #8). Each channel includes a bus for transmitting data, commands and addresses.

The DRAM interface 14 is a DRAM controller configured to control the DRAM 6 under control of the CPU 12.

The memory area of the DRAM 6 may be used as a write buffer (WB) 31 for temporarily storing data to be written to the NAND memory 5. The memory area of the DRAM 6 may also be used as a GC buffer 32 for temporarily storing data moved during a garbage collection (GC) operation. The memory area of the DRAM 6 may further be used for storing the above-mentioned look-up table 33.

The SSD 3 may further hold other various management data items. As an example of the management data, a page management table holding valid/invalid flags corresponding to respective physical addresses may be included. Each valid/invalid flag indicates whether the corresponding physical address (e.g., physical page) is valid or invalid. The valid physical page means that the data therein is valid data. The invalid physical page means that the data therein is invalided by updating (rewriting).

Next, the configuration of the host 2 will be described.

The host 2 is an information processing apparatus for executing various programs. The programs executed by the host include an application software layer 41, an operating system (OS) 42 and a file system 43.

As generally known, the operating system (OS) 42 is software configured to manage the entire host 2, control the hardware in the host 2, and enable applications to use the hardware and the SSD 3.

The file system 43 is used for controlling the operation (creation, saving, update, deletion, etc.) of a file. For instance, ZFS, Btrfs, XFS, ext4, NTFS, etc., may be used as the file system 43. Alternatively, a file object system (such as Ceph Object Memory Daemon) or a key value store system (for example, Rocks DB) may be used as the file system 43.

Various application software threads run on the application software layer 41. Examples of the application software threads are client software, database software, virtual machine, etc.

When the application software layer 41 needs to send a request, such as a read command or a write command, to the SSD 3, it sends the request to the OS 42. The OS 42 sends that request to the file system 43. The file system 43 translates that request into a command (a read command, a write command, etc.). The file system 43 sends the command to the SSD 3. Upon receiving a response from the SSD 3, the file system 43 sends that response to the OS 42. The OS 42 sends that response to the application software layer 41.

The host 2 may further include a device performance manager 44. The device performance manager 44 receives a notification of performance reduction from a certain SSD in the SSD array, and transmits the notification of performance reduction to each of the other SSDs in the SSD array.

Figure 9:
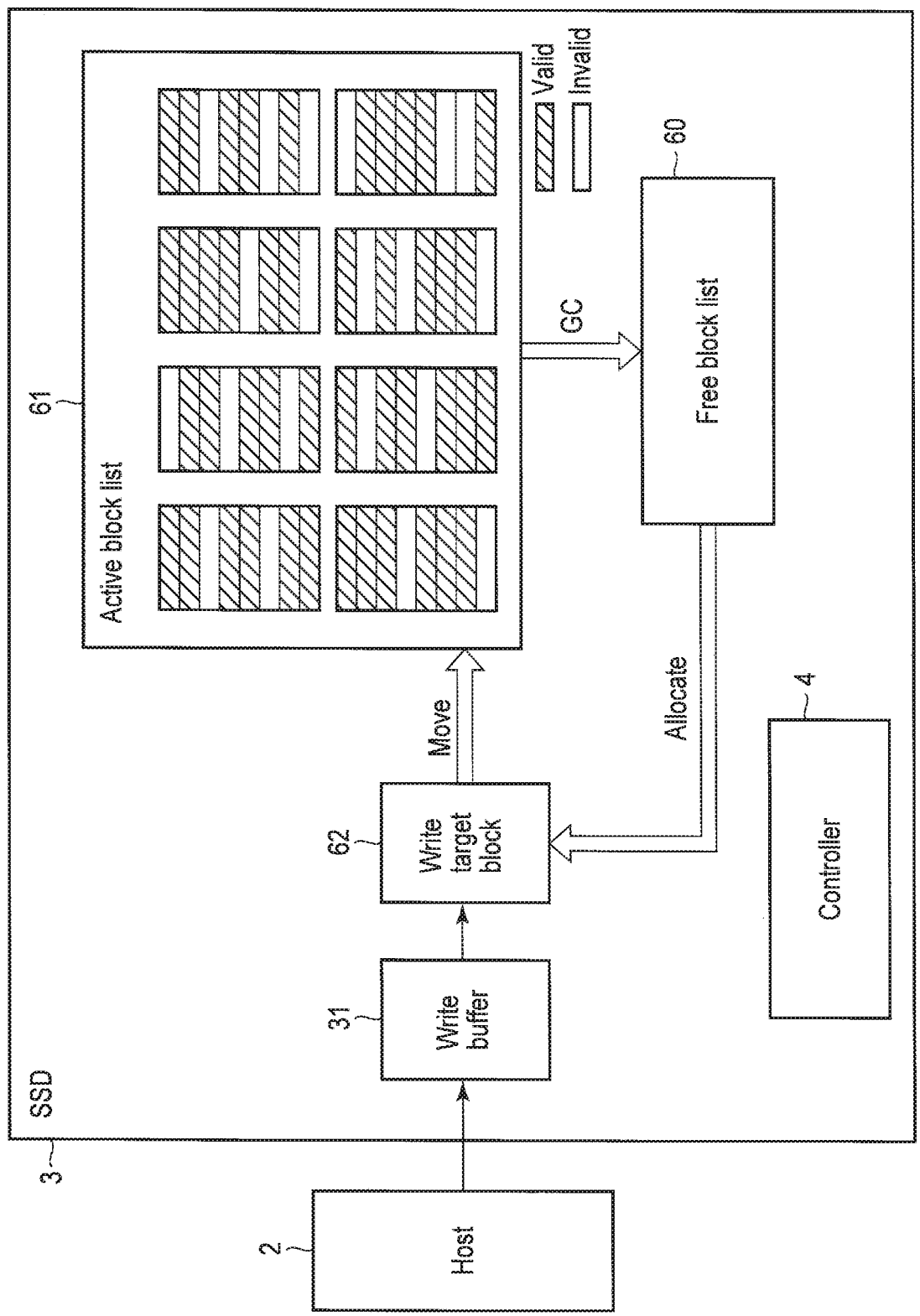
FIG. 9 is a view for illustrating an operation of successively allocating free blocks for writing of data from a host, performed by the memory system functioning as the sending-side SSD.

FIG. 9 shows an operation of successively allocating free blocks for writing data received from the host 2.

The controller 4 allocates, as a write target block 62, one of the free blocks listed in a free block list 60.

The controller 4 writes, to the write buffer 31, write data received from the host 2. After that, while updating the look-up table (LUT) 33, the controller 4 sequentially writes the write data in the write buffer 31 to the write target block 62, from the first page toward the last page of the block 62.

If the write target block 62 does not have any more available page, the controller 4 manages the write target block 62 as an active block (block containing data). Therefore, the controller 4 moves the write target block 62 to an active block list 61. After that, the controller 4 allocates a free block in the free block list 60 as a new write target block 62.

If all data of a block included in the active block list 61 is invalidated by its updating, this block is moved to the free block list 60.

If the number of free blocks in the free block list 60 decreases to a value equal to or less than a particular threshold, the above-mentioned garbage collection (GC) operation is performed for creating a free block.

FIG. 10 shows the garbage collection (GC) operation performed by the controller 4.

More specifically, FIG. 10 shows an example case where four blocks B11, B12, B13 and B14 are selected as of GC operation targets. The controller 4 selects some blocks to be set GC operation targets from blocks in which valid data (valid pages) and invalid data (invalid pages) are mixed. The controller 4 may refer to the above-mentioned page management table that holds valid/invalid flags corresponding to the respective physical addresses, thereby preferentially selecting, as GC operation targets, blocks that contain larger amounts of invalid data. The controller 4 copies the valid data of the GC operation target blocks to at least one copy destination block.

The number of copy destination blocks required for the GC operation is determined based on the amount of valid data to be copied by the GC operation. FIG. 10 shows a case where two free blocks are set as copy destination blocks B101 and B102.

Copy destination block B101 and B102 are filled with valid data. Block B11, B12, B13 and B14 become free blocks which do not contain valid data.

Blocks B11, B12, B13 and B14 that have become to free blocks are moved to the free block list 60.

FIG. 11 shows the relationship between the NAND interface 13 and a plurality of NAND memory chips.

More specifically, FIG. 11 shows an example case where four NAND memory chips are connected to each of eight channels (CH #1 to CH #8) included in the NAND interface 13. The NAND interface 13 can change, under control of the controller 4, the number of NAND memory chips to be simultaneously driven (driven in parallel) per channel.

If the number of NAND memory chips simultaneously driven per channel is set to 4, the total number of NAND memory chips simultaneously driven (by a parallel operation) is 32 (that realizes maximum write performance).

If the number of NAND memory chips simultaneously driven per channel is set to 3, the total number of NAND memory chips simultaneously driven (by a parallel operation) is 24 (that realizes 75% of the maximum write performance).

If the number of NAND memory chips simultaneously driven per channel is set to 2, the total number of NAND memory chips simultaneously driven (by a parallel operation) is 16 (that realizes 50% of the maximum write performance).

If the number of NAND memory chips simultaneously driven per channel is set to 1, the total number of NAND memory chips simultaneously driven (by a parallel operation) is 8 (that realizes 25% of the maximum write performance).

By thus changing the number (total) of NAND memory chips simultaneously driven (by a parallel operation), the write performance, power consumption and thermal generation of the SSD 3 can be adjusted.

FIG. 12 shows a duty control operation.

In a write operation of writing data to the NAND memory 5, the thirty-two NAND memory chips may be intermittently driven. The cycle (duty width) of intermittent driving includes an ON period in which a write operation is performed, and an OFF period in which no write operation is performed.

In the ON period, the thirty-two NAND memory chips may be all simultaneously driven (by a parallel operation). At this time, each NAND memory chip assumes a busy state where a write operation is advancing.

In the OFF period, none of the thirty-two NAND memory chips is driven. At this time, each NAND memory chip assumes an idle state where no write operation is performed.

By controlling the ratio of the ON period to one cycle, the write performance, power consumption and thermal generation of the SSD 3 can be adjusted. For example, if the ON period is set to one second when one cycle (duty width) is ten seconds (duty ratio=10%), the write performance of the SSD 3 is restricted to 10% of the maximum write performance. At this time, the mean power consumption of the SSD 3 for ten seconds is $\frac{1}{10}$ of the power consumption at the time of the maximum write performance.

Figure 13:
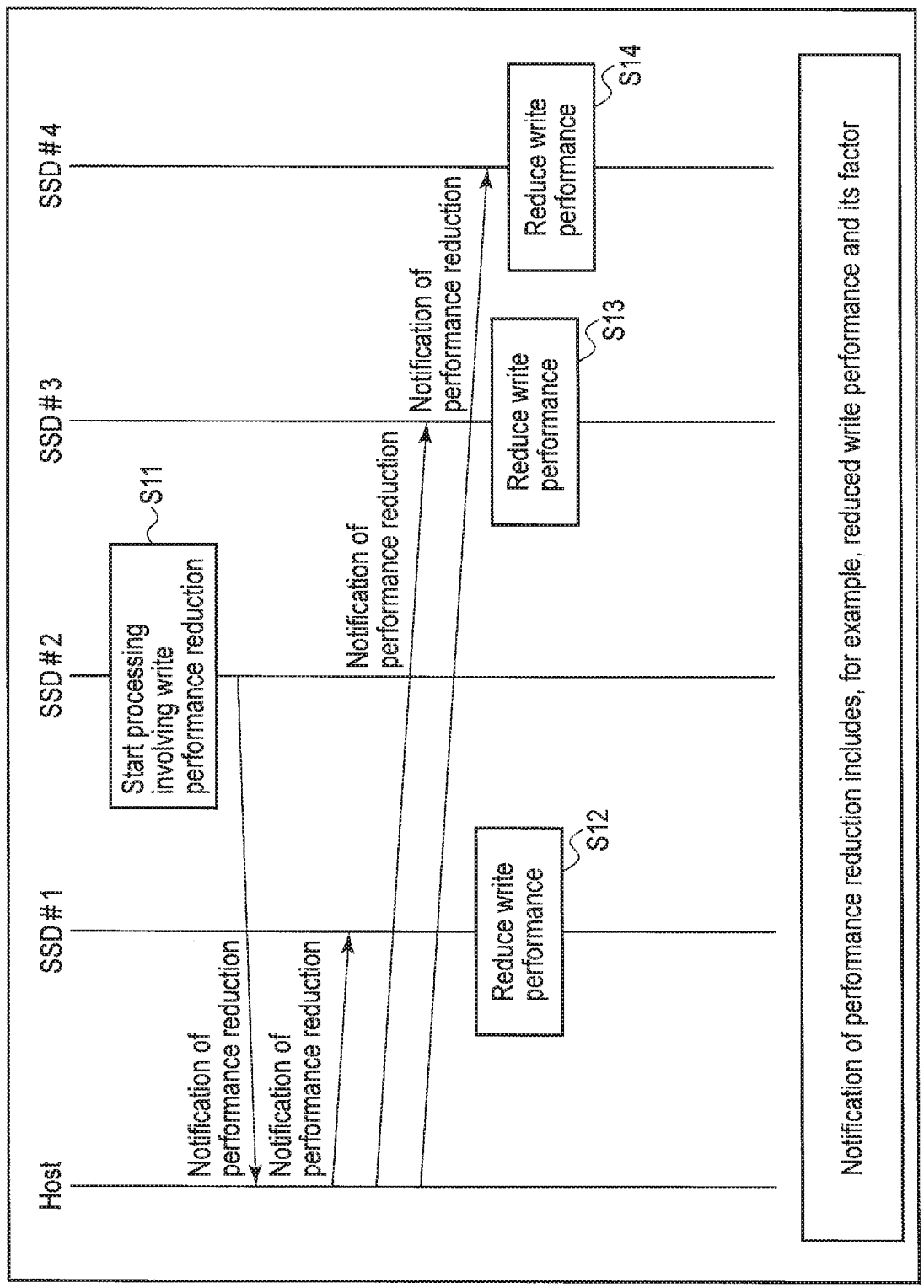
FIG. 13 is a view for illustrating an example of performance reduction notification processing performed by the memory system functioning as the sending-side SSD.

FIG. 13 shows an example of performance reduction notification processing executed by a sending-side SSD.

The controller 4 of SSD #2, which functions as the sending-side SSD, starts processing (above-mentioned internal operation) that is the factor of write performance reduction, when necessary (step S11). In step S11, the controller 4 estimates a value related to an amount of reduction in the write performance of SSD #2, and transmits, to the host 2, a notification of the write performance reduction of SSD #2. The notification of the performance reduction includes the estimated value (for example, a write performance after the reduction, or an amount of reduction in the write performance) and factor data. The factor data indicates whether the factor of the write performance reduction is the garbage collection (GC) operation, the thermal throttling operation, or the power-restriction throttling operation.

Upon receiving, from SSD #2, the notification of the write performance reduction, the host 2 transmits the notification to SSD #1, SSD #3 and SSD #4. Each of SSD #1, SSD #3 and SSD #4 functions as a receiving-side SSD configured to reduce its own write performance to the received, reduced write performance. The controller of SSD #1 performs processing of reducing its own write performance to the received, reduced write performance (step S12). In step S12, the controller of SSD #1 may perform a GC operation within a range in which the write performance of SSD #1 is not less than the received, reduced write performance. Alternatively, the controller of SSD #1 may perform a throttling operation of restricting the number of NAND memory chips simultaneously driven or the above-mentioned duty ratio within a range in which the write performance of SSD #1 is not less than the received, reduced write performance. Further, the controller of SSD #1 may determine either the GC operation or the throttling operation, based on the received factor data.

For example, if the received factor data indicates the GC operation or power restriction (throttling operation), the controller of SSD #1 may perform either the GC operation or the throttling operation.

In contrast, if the factor of the write performance reduction is "thermal protection for preventing overheating" (thermal throttling operation), the controller of SSD #1 reduces own write performance not by the GC operation but by the throttling operation. Thus, an excessive temperature increase of the whole SSD array can be suppressed.

Similarly, SSD #3 and SSD #4 perform processing of reducing their own write performance to the received, reduced write performance (steps S13 and S14).

FIG. 14 shows another example of performance reduction notification processing executed by the sending-side SSD.

The controller 4 of SSD #2 that functions as the sending-side SSD starts processing (above-mentioned internal operation) leading to write performance reduction of SSD #2, when necessary (step S21). In step S21, the controller 4 estimates a value related to an amount of reduction in the write performance of SSD #2, and transmits a notification of the write performance reduction, to SSD #1, SSD #3 and SSD #4. The notification of the performance reduction includes the estimated value (for example, write performance after the reduction, or an amount of reduction in the write performance), and the above-mentioned factor data.

SSD #1, SSD #3 and SSD #4 each perform processing of reducing their own write performance to the received, reduced write performance (steps S22, S23 and S24).

Figure 15:
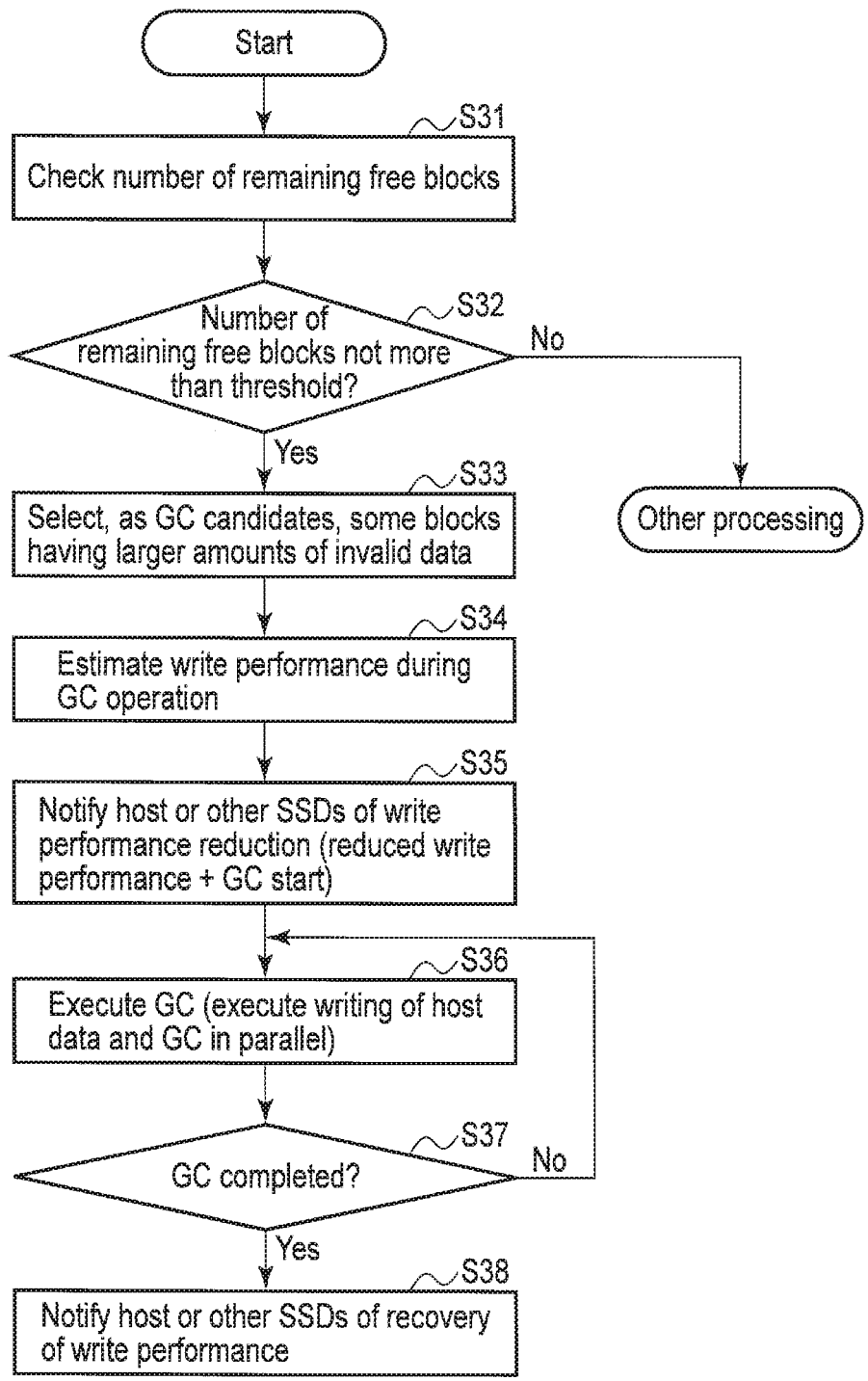
FIG. 15 is a flowchart for illustrating a procedure of GC operation and performance reduction notification processing performed by the memory system functioning as the sending-side SSD.

The flowchart of FIG. 15 shows the procedure of a GC operation and a performance reduction notification operation performed by the sending-side SSD.

The controller 4 of the sending-side SSD periodically checks the number of remaining free blocks (step S31), and determines whether the number of remaining free blocks is equal to or less than a threshold (step S32).

If the number of remaining free blocks is equal to or less than the threshold (YES in step S32), the controller 4 selects, as GC target blocks (GC candidates), some blocks having greater amounts of invalid data (step S33). Based on the amount of data to be copied during the GC operation, namely, the amounts of valid data of respective GC target blocks, the controller 4 estimates the write performance of the sending-side SSD during the GC period (step S34). In step S34, a value related to an amount of reduction in the write performance of the sending-side SSD is estimated based on the amount of data to be copied during the GC operation. The value may indicate a reduced write performance (write performance after reduction due to the GC), or an amount of reduction in the write performance due to the GC.

The controller 4 sends, to the host 2 or the other SSDs in the SSD array, a notification of performance reduction including the estimated value (estimated write performance) and factor data (GC operation), thereby notifying the host 2 or the other SSDs in the SSD array that (1) the write performance of the sending-side SSD has reduced, (2) to what degree the write performance has reduced, and (3) why the write performance has reduced (step S35).

The controller 4 performs the GC operation of copying the valid data of GC target blocks to a copy destination block, thereby increasing the number of free blocks (step S36). In step S36, the controller 4 may execute processing of writing write data (host data), received from the host 2, to a write target block, and the GC operation in parallel. In this case, based on the amount of data needed to be copied for the GC operation, the controller 4 may determine the ratio of the amount of host data which is to be written to the target write block, to the amount of data to be copied to the copy destination block for the GC operation, and may execute host data writing processing and the GC operation in parallel, based on the determined ratio.

If the GC operation has been completed (YES in step S37), the controller 4 sends, to the host 2 or the other SSDs in the SSD array, a notification that the write performance of the sending-side SSD has recovered to the normal write performance (step S38). This notification may include a value (for example, 1 Gbyte/s) indicating the normal write performance.

Figure 16:
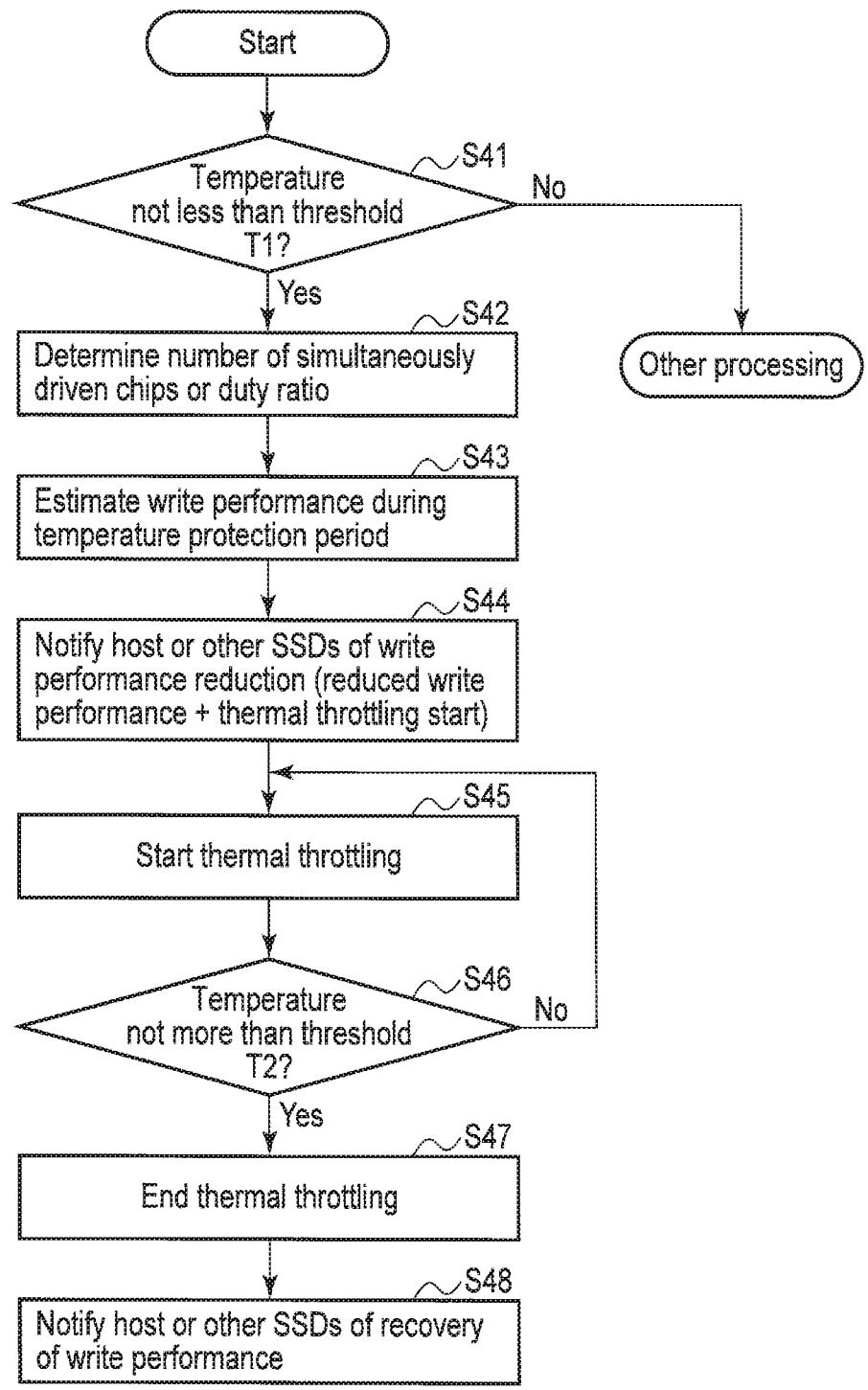
FIG. 16 is a flowchart for illustrating a procedure of thermal throttling operation and performance reduction notification processing performed by the memory system functioning as the sending-side SSD.

The flowchart of FIG. 16 shows the procedure of the thermal throttling operation and performance-reduction notifying processing executed by the sending-side SSD.

The controller 4 of the sending-side SSD periodically checks the temperature in the sending-side SSD detected by the temperature sensor 7, and determines whether the detected temperature is not less than threshold T1 (step S41).

If the detected temperature is not less than threshold T1 (YES in step S41), the controller 4 determines the number of NAND memory chips to be simultaneously driven, or the above-mentioned duty ratio (step S42). Based on the determined number of NAND memory chips or the determined duty ratio, the controller 4 estimates the write performance of the sending-side SSD during a temperature protection period (namely, during the thermal throttling operation) (step S43). In step S43, a value related to an amount of reduction in the write performance of the sending-side SSD is estimated based on the determined number of NAND memory chips or the determined duty ratio. The value may indicate a reduced write performance (write performance after reduction due to the thermal throttling operation), or an amount of reduction in the write performance due to the thermal throttling operation.

The controller 4 sends, to the host 2 or the other SSDs in the SSD array, a notification of performance reduction including the estimated value (estimated write performance) and factor data (thermal throttling operation), thereby notifying the host 2 or the other SSDs in the SSD array that (1) the write performance of the sending-side SSD has reduced, (2) to what degree the write performance has reduced, and (3) why the write performance has reduced (step S44).

The controller 4 starts a thermal throttling operation by restricting the number of currently simultaneously driven NAND memory chips or the currently-used duty ratio, based on the determination in step S42 (step S45). By this thermal throttling operation, the calorific value of the sending-side SSD is reduced.

The controller 4 periodically checks the temperature in the sending-side SSD detected by the temperature sensor 7, and determines whether the detected temperature is not more than threshold T2 (step S46). Threshold T2 may be set lower than threshold T1.

If the detected temperature is not more than threshold T2 (YES in step S46), the controller 4 finishes the thermal throttling operation by releasing the restriction of the number of simultaneously driven NAND memory chips, or releasing the restriction of the duty ratio (step S47). After that, the controller 4 transmits, to the host 2 or the other SSDs in the SSD array, a notification of the recovery of the write performance of the sending-side SSD, thereby notifying the host 2 or the other SSDs in the SSD array that the write performance of the sending-side SSD has recovered to the normal write performance (step S48). The notification of the recovery of the write performance may include a value (for example, 1 Gbyte/s) indicating the normal write performance.

Although FIG. 16 is directed to the case of switching two operations (start of the thermal throttling operation and stop of the same) based on the detected temperature, control of switching the number of simultaneously driven NAND memory chips or the duty ratio in multiple steps based on the detected temperature may be executed instead. For instance, when the detected temperature has reduced to threshold T3 between thresholds T1 and T2, the controller may re-determine the number of NAND memory chips to be simultaneously driven or the duty ratio to be used, and may restrict the number of currently simultaneously driven NAND memory chips or the current duty ratio, based on the re-determined number of NAND memory chips or the re-determined duty ratio. In this case, the controller 4 re-estimates a value related to an amount of reduction in the write performance, based on the re-determined number of NAND memory chips or the re-determined duty ratio, and may send, to the host 2 or the other SSDs in the SSD array, a notification of performance reduction that includes the estimated value and factor data (thermal throttling operation).

Figure 17:
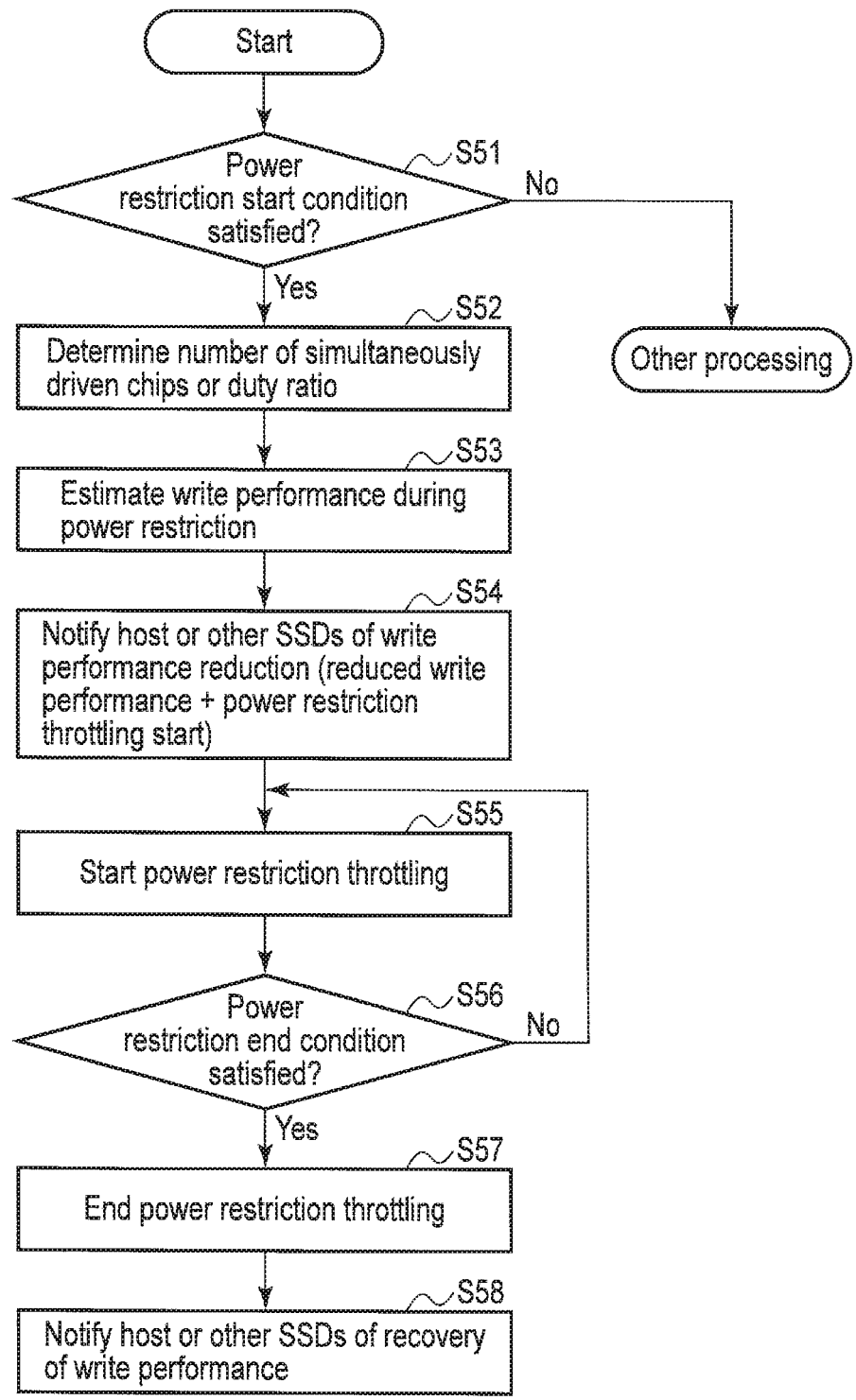
FIG. 17 is a flowchart for illustrating a procedure of power-constraint throttling operation and performance reduction notification processing performed by the memory system functioning as the sending-side SSD.

The flowchart of FIG. 17 shows the procedure of the power-restriction throttling operation and the performance-reduction notification processing performed by the sending-side SSD.

The controller 4 of the sending-side SSD determines whether power restriction should be started, that is, whether a power-restriction start condition is satisfied, based on the relationship between the current power consumption of the sending-side SSD and the maximum power allowed to the sending-side SSD (step S51). The power consumption of the sending-side SSD is calculated as a function of the power consumption of each NAND memory chip and the number of simultaneously driven NAND memory chips (or the duty ratio). If the power consumption of the sending-side SSD is greater than the maximum power allowed to the sending-side SSD by the host 2, the controller 4 determines the number of simultaneously driven NAND memory chips, or the duty ratio, based on the maximum power allowed to the sending-side SSD and the power consumption of each NAND memory chip (power consumption per chip), so that the power consumption of the sending-side SSD becomes equal to or less than the maximum power (step S52).

Based on the determined number of simultaneously driven NAND memory chips, or the determined duty ratio, the controller 4 estimates the write performance of the sending-side SSD during a power restriction period (power-restriction throttling period) (step S53). In step S53, a value related to an amount of reduction in the write performance of the sending-side SSD is estimated based on the determined number of NAND memory chips or the determined duty ratio. The value may indicate a reduced write performance (write performance after reduction due to the power-restriction throttling operation), or an amount of reduction in the write performance due to the power-restriction throttling operation.

The controller 4 sends, to the host 2 or the other SSDs in the SSD array, a notification of performance reduction including the estimated value (estimated write performance) and factor data (power-restriction throttling operation), thereby notifying the host 2 or the other SSDs in the SSD array that (1) the write performance of the sending-side SSD has reduced, (2) to what degree the write performance has reduced, and (3) why the write performance has reduced (step S54).

The controller 4 starts a power-restriction throttling operation by restricting the number of simultaneously driven NAND memory chips, or the duty ratio, based on the determination result in step S52 (step S55). By this power-restriction throttling operation, the power consumption of the sending-side SSD is reduced.

The host 2 may change the maximum power allowed to the sending-side SSD, when necessary. For example, if the host 2 requires an increase in the write performance of the whole SSD array, it may increase the maximum power allowed to each SSD. In this case, the controller 4 determines whether a condition for finishing power restriction is satisfied (step S56).

If the condition is satisfied (YES in step S56), the controller 4 finishes the power-restriction throttling operation by releasing the restriction of the number of simultaneously driven NAND memory chips, or the restriction of the duty ratio (step S57). After that, the controller 4 sends, to the host 2 or the other SSDs in the SSD array, a notification of recovery of the write performance of the sending-side SSD, thereby notifying the host 2 or the other SSDs in the SSD array that the write performance of the sending-side SSD has recovered to the normal write performance (step S58). The notification of the recovery of the write performance may include a value (for example, 1 Gbyte/s.) indicating the normal write performance.

Similarly, in order to reduce the power consumption of the information processing system 1, the host 2 may reduce the maximum power allowed to each SSD. In this case, the controller 4 re-determines the number of NAND memory chips to be simultaneously driven or re-determines the duty ratio, based on the reduced maximum power allowed to the sending-side SSD, and the power consumption of each NAND memory chip (power consumption per chip), so that the power consumption of the sending-side SSD will be equal to or less than the reduced maximum power. Further, the controller 4 restricts the number of NAND memory chips currently simultaneously driven or the current duty ratio, based on the re-determined number of simultaneously driven NAND memory chips or the re-determined duty ratio. The controller 4 re-estimates a value related to an amount of reduction in the write performance, based on the re-determined number of simultaneously driven NAND memory chips or the re-determined duty ratio, and sends, to the host or the other SSDs in the SSD array, a notification of performance reduction that includes the estimated value and factor data (power-restriction throttling operation).

FIG. 18 shows a configuration example of the SSD 3 functioning as the above-mentioned receiving-side SSD.

The receiving-side SSD comprises a write performance adjustment unit 25 instead of the write performance reduction notification unit 24.

The write performance adjustment unit 25 receives, from host 2 or another SSD, a notification that the write performance of said another SSD has reduced, and executes processing of reducing the write performance of the receiving-side SSD, based on the value related to an amount of reduction of the write performance, which is designated by the notification, and the performance reduction factor designated by the notification.

If the factor data included in the received notification is associated with a GC operation or a power-restriction throttling operation, the write performance adjustment unit 25 may perform the GC operation. In this case, the write performance adjustment unit 25 determines the ratio of the amount of write data from the host 2, which is to be written to a write target block, to the amount of data to be copied to a copy destination block for the GC operation, based on the value related to the amount of reduction of the write performance. Based on this ratio, the write performance adjustment unit 25 performs a GC operation using the garbage collection operation control unit 21.

For example, if the ratio of the amount of write data to the amount of data to be copied for the GC operation is 1 to 1, an operation of copying a particular amount of valid data from a GC target block to a copy destination block may be performed whenever this particular amount of write data is written to a write target block.

If factor data included in the received notification indicates thermal throttling, the write performance adjustment unit 25 does not perform a GC operation, and reduces the write performance of the receiving-side SSD by a throttling operation. In this case, the write performance adjustment unit 25 determines the number of NAND memory chips to be simultaneously driven or the duty ratio to be used, based on the value included in the received notification (e.g., reduced write performance), and restricts the number of currently simultaneously driven NAND memory chips or the current duty ratio, based on the determined number of NAND memory chips or the determined duty ratio.

The flowchart of FIG. 19 shows the procedure of the write performance reduction processing performed by the receiving-side SSD.

When having received, from the host 2 or another SSD, a notification that the write performance of said another SSD has reduced (YES in step S61), the controller 4 of the receiving-side SSD checks the factor of the write performance reduction of said another SSD, based on factor data included in the received notification (step S62).

If the factor of the write performance reduction of said another SSD is a GC operation (YES in step S63), the controller 4 of the receiving-side SSD reduces its write performance to a level substantially equal to the reduced write performance of said another SSD, by performing a GC operation in advance or performing a throttling operation (step S64).

If the factor of the write performance reduction of said another SSD is thermal protection (thermal throttling) (YES in step S65), the controller 4 of the receiving-side SSD reduces its write performance to a level substantially equal to the reduced write performance of said another SSD, by performing a throttling operation (step S66). At this time, in order to prevent an excessive temperature rise, the receiving-side SSD is inhibited from performing a GC operation in advance.

If the factor of the write performance reduction of said another SSD is power restriction (power restriction throttling) (YES in step S67), the controller 4 of the receiving-side SSD reduces its write performance to a level substantially equal to the reduced write performance of said another SSD, by performing a throttling operation (step S68). Alternatively, the controller 4 of the receiving-side SSD may perform a GC operation an advance within a range in which the power consumption of the receiving-side SSD will not depart from the maximum power allowed thereto.

In addition, when having received, from the host 2 or another SSD, a notification of the recovery of the write performance of said another SSD, the controller 4 of the receiving-side SSD performs processing of recovering the write performance of the receiving-side SSD to the normal write performance (for example, 1 Gbyte/s) by stopping the GC operation or the throttling operation.

Figure 20:
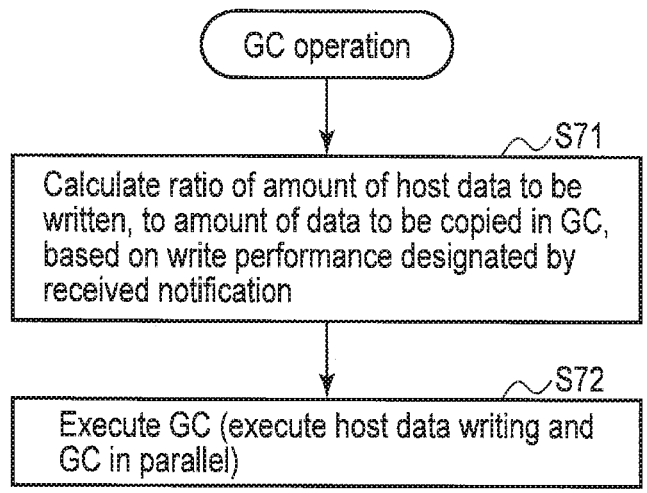
FIG. 20 is a flowchart for illustrating a procedure of a GC operation performed by the memory system functioning as the receiver-side SSD when a performance reduction notification has been received.

The flowchart of FIG. 20 shows the procedure of a GC operation performed by the receiving-side SSD when a notification of performance reduction has been received.

Based on the notified value related to the amount of reduction in the write performance of the sending-side SSD, the controller 4 of the receiving-side SSD calculates the ratio of the amount of write data from the host 2, which is to be written to a write target block, to the amount of data to be copied to a copy destination block for a GC operation (step S71), and performs the GC operation with the calculated ratio (step S72).

For example, when the receiving-side SSD is operating with a write performance of 1 Gbyte/s, and the write performance of the sending-side SSD has been reduced to 512 Mbytes/s, the controller 4 of the receiving-side SSD may reduce the write performance of the receiving-side SSD to 512 Mbytes/s, and may use the remaining write performance (in this case, 512 Mbytes/s) for a GC operation. At this time, the ratio of the amount of write data to the amount of data copied for the GC operation is 1 to 1. In step S72, a write operation and a GC operation are performed in parallel so that the ratio of the amount of write data from the host 2 to the amount of data copied for the GC operation will become 1 to 1.

Figure 21:
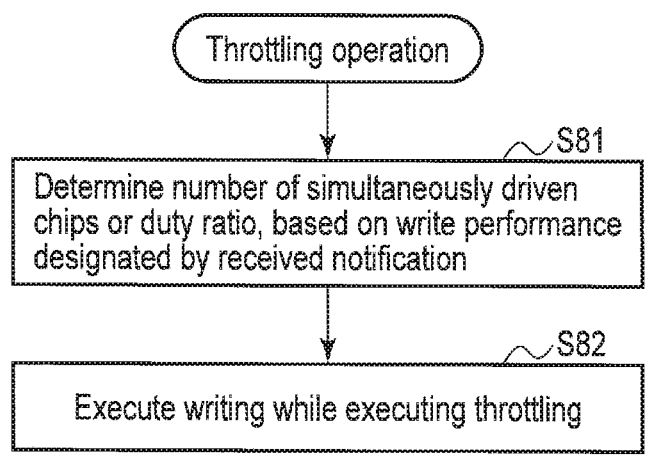
FIG. 21 is a flowchart for illustrating a procedure of a throttling operation performed by the memory system functioning as the receiver-side SSD when a performance reduction notification has been received.

The flowchart of FIG. 21 shows the procedure of a throttling operation performed by the receiving-side SSD when a notification of performance reduction has been received.

Based on the notified value related to the amount of reduction in the write performance of the sending-side SSD, the controller 4 of the receiving-side SSD determines the number of NAND memory chips to be simultaneously driven in the receiving-side SSD, or a duty ratio for intermittently operating the NAND memory chips in the receiving-side SSD (step S81), and executes a write operation while performing a throttling operation based on the determined number of NAND memory chips or the determined duty ratio (step S82).

FIG. 22 shows a configuration example of an SSD that has both functions corresponding to the sending-side SSD and the receiving-side SSD.

The controller 4 of the SSD 3 having both functions corresponding to the sending-side SSD and the receiving-side SSD includes the above-mentioned write performance reduction notification unit 24 and write performance adjustment unit 25.

FIG. 23 shows a hardware configuration example of the information processing apparatus that functions as the host 2.

The information processing apparatus is realized as a server computer or a personal computer.

The information processing apparatus may comprise a processor (CPU) 101, a main memory 102, a BIOS-ROM 103, a network controller 105, a peripheral interface controller 106, a controller 107, an embedded controller (EC) 108, etc.

The processor 101 is a CPU configured to control the operation of each component of the information processing apparatus. The processor 101 executes various programs loaded from any one of the SSDs 3 or from another memory device to the main memory 102. The main memory 102 comprises a random access memory such as a DRAM. The programs executed by the processor 101 include the above-described application software layer 41, the operating system 42, the file system 43 and the device performance manager 44.

The network controller 105 is a communication device, such as a wired LAN controller or a wireless LAN controller. The peripheral interface controller 106 is configured to communicate with a peripheral device, such as a USB device.

The controller 107 is connected to a plurality of connectors 107A, and is configured to communicate with devices connected to the connectors 107A. In the embodiment, plural SSDs 3 are connected to the respective connectors 107A. The controller 107 may be a chip set having the function of a RAID controller. If the processor 101 includes a PCIe Switch, each of the SSDs may be directly connected to the processor 101 via a PCIe bus.

The EC 108 functions as a system controller configured to perform power management of the information processing apparatus. The EC 108 turns on and off the information processing apparatus in response to a user's operation of a power switch. The EC 108 is realized as a processing circuit such as a one-chip microcontroller. The EC 108 may contain a keyboard controller for controlling an input device such as a keyboard (KB).

Figure 24:
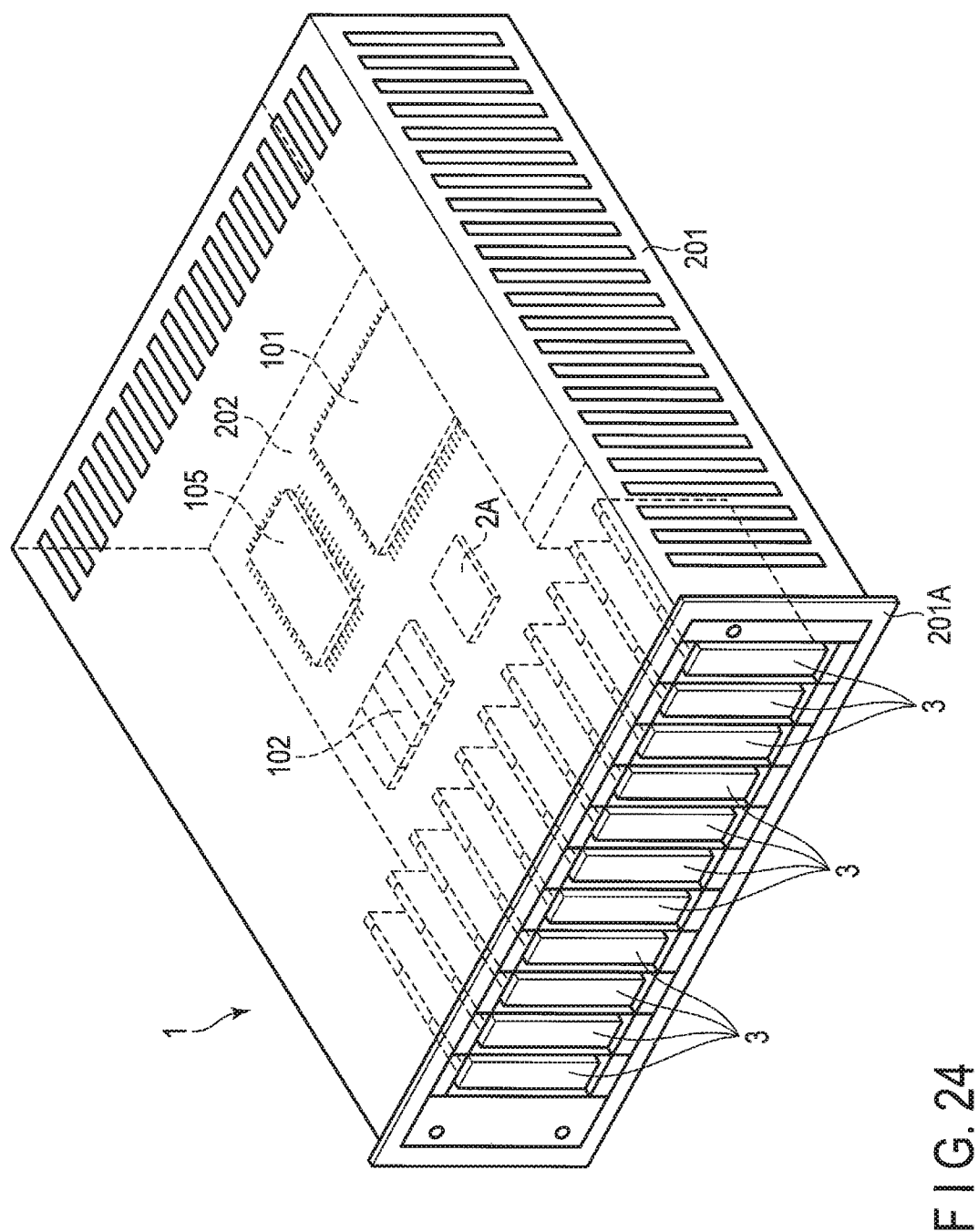
FIG. 24 is a perspective view illustrating a configuration example of a computer that includes both the memory system of the embodiment and the host.

FIG. 24 shows a configuration example of the information processing apparatus including plural SSDs 3 and the host 2.

The information processing apparatus may comprise a thin box-shaped housing 201 that can be accommodated in a rack. The SSDs 3 may be arranged in the housing 201. In this case, the SSDs 3 may be detachably inserted in respective slots formed in the front surface 201A of the housing 201.

A system board (mother board) 202 may be placed in the housing 201. On the system board (mother board) 202, various electronic components, which include the CPU 101, the memory 102, the network controller 105 and the controller 107, are mounted. These electronic components cooperate to function as the host 2.

As described above, in the sending-side SSD of the embodiment, when the sending-side SSD starts the internal operation, a value related to an amount of reduction in performance of the write operation for writing data from the host 2 to the NAND memory 5 is estimated, and the estimated value is notified to the host 2 or one or more other SSDs in the SSD array. Thus, information used to enable the SSDs in the SSD array to cooperate with each other can be provided to the host 2 or other SSDs, with the result that the other SSDs in the SSD array can effectively use a period in which the write performance of the sending-side SSD is reduced.

In addition, the embodiment employs a NAND memory as an example of the nonvolatile memory. However, the function of the embodiment is also applicable to other various nonvolatile memories, such as a magnetoresistive random access memory (MRAM), a phase-change random access memory (PRAM), a resistive random access memory (ReRAM), and a ferroelectric random access memory (FeRAM).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage array connectable to a host, the storage array comprising:
a plurality of memory systems including a first memory system and a second memory system, the first memory system including:
a nonvolatile memory; and
a controller electrically connected to the nonvolatile memory and configured to execute a write operation of writing data, received from the host, to the nonvolatile memory, and an internal operation, wherein
when starting the internal operation, the controller of the first memory system:
estimates one of (i) a reduced write throughput obtained after write throughput of the first memory system has reduced due to a start of the internal operation, and (ii) an amount of reduction in the write throughput due to the start of the internal operation, on the basis of content of the started internal operation; and
notifies the second memory system of the estimated reduced write throughput or the estimated amount of reduction in the write throughput.

2. The storage array of claim 1, wherein the internal operation includes at least one of a garbage collection operation of the nonvolatile memory, a thermal protection operation for preventing excessive heating of the first memory system, and a power restriction operation for suppressing power consumption of the first memory system to be less than a maximum power allowed thereto.

3. The storage array of claim 1, wherein
the internal operation includes a garbage collection operation of the nonvolatile memory; and
when starting the garbage collection operation, the controller of the first memory system estimates the one of the reduced write throughput and the amount of reduction in the write throughput, on the basis of an amount of data to be copied by the garbage collection operation.

4. The storage array of claim 1, wherein, when the write throughput is recovered at an end of the internal operation, the controller of the first memory system notifies the second memory system of recovery of the write throughput.

5. The storage array of claim 1, wherein
the internal operation includes a thermal protection operation for preventing excessive heating of the first memory system;
the nonvolatile memory includes a plurality of nonvolatile memory chips; and
the controller of the first memory system is further configured to:
restrict, in carrying out the thermal protection operation, the number of nonvolatile memory chips operated in parallel, or a ratio of a first period to one cycle including the first period and a second period, on the basis of a temperature in the first memory system detected by a temperature sensor, the first period being a period in which the nonvolatile memory chips are operated in parallel, the second period being a period in which the nonvolatile memory chips are not operated; and
estimate the one of the reduced write throughput and the amount of reduction in the write throughput, on the basis of restricting the number of nonvolatile memory chips operated in parallel, or the ratio of the first period to the one cycle.

6. The storage array of claim 1, wherein
the internal operation includes a power restriction operation for suppressing power consumption of the first memory system to be less than a maximum power allowed thereto;
the nonvolatile memory includes a plurality of nonvolatile memory chips; and
the controller of the first memory system is further configured to:
restrict, in carrying out the power restriction operation, the number of nonvolatile memory chips operated in parallel, or a ratio of a first period to one cycle including the first period and a second period, on the basis of a maximum power allowed to the first memory system and power consumption of each of the nonvolatile memory chips, the first period being a period in which the nonvolatile memory chips are operated in parallel, the second period being a period in which the nonvolatile memory chips are not operated; and
estimate the one of the reduced write throughput and the amount of reduction in the write throughput, on the basis of restricting the number of nonvolatile memory chips operated in parallel, or the ratio of the first period to the one cycle.

7. The storage array of claim 1, wherein
the internal operation includes a garbage collection operation of the nonvolatile memory, a thermal protection operation for preventing excessive heating of the first memory system, and a power restriction operation for suppressing power consumption of the first memory system to be less than a maximum power allowed thereto; and
when starting one of the garbage collection operation, the thermal protection operation and the power restriction operation as the internal operation, the controller of the first memory system notifies the second memory system of the estimated reduced write throughput or the estimated amount of reduction in the write throughput, and factor data indicating which one of the garbage collection operation, the thermal protection operation and the power restriction operation is a cause for the reduction in the write throughput.

8. The storage array of claim 1, wherein the controller of the first memory system is configured to notify the second memory system, via the host, of the estimated reduced write throughput or the estimated amount of reduction in the write throughput.

9. The storage array of claim 1, wherein the second memory system is configured to reduce write throughput of the second memory system on the basis of the notification so as to correspond to the estimated reduced write throughput of the first memory system.

10. A storage array connectable to a host, the storage array comprising:
a plurality of memory systems including a first memory system and a second memory system, the first memory system including:
a nonvolatile memory; and a controller electrically connected to the nonvolatile memory and configured to execute a write operation of writing data, received from the host, to the nonvolatile memory, and an internal operation, the internal operation including a garbage collection operation of the nonvolatile memory, a thermal protection operation for preventing excessive heating of the first memory system, and a power restriction operation for suppressing power consumption of the first memory system to be less than a maximum power allowed thereto, wherein when starting one of the garbage collection operation, the thermal protection operation and the power restriction operation, the controller of the first memory system:
  estimates one of (i) a reduced write throughput obtained after write throughput of the first memory system has reduced due to a start of the one of the garbage collection operation, the thermal protection operation, and the power restriction operation, and (ii) an amount of reduction in the write throughput due to the start of the one of the garbage collection operation, the thermal protection operation, and the power restriction operation; and
  notifies the second memory system of the estimated reduced write throughput or the estimated amount of reduction in the write throughput, and factor data indicating which one of the garbage collection operation, the thermal protection operation and the power restriction operation is a cause for the reduction in the write throughput.

11. The storage array of claim 10, wherein the controller of the first memory system is configured to notify the second memory system, via the host, of the estimated reduced write throughput or the estimated amount of reduction in the write throughput, and the factor data.

12. The storage array of claim 10, wherein the second memory system is configured to reduce write throughput of the second memory system on the basis of the notification so as to correspond to the estimated reduced write throughput of the first memory system.

13. A method for controlling a storage array that includes a plurality of memory systems including a first memory system and a second memory system, the method comprising:
  executing a write operation for writing data, received from a host, to a nonvolatile memory in the first memory system;
  executing an internal operation for managing the first memory system;
  estimating one of (i) a reduced write throughput obtained after write throughput of the first memory system has reduced due to a start of the internal operation, and (ii) an amount of reduction in the write throughput due to the start of the internal operation, when the internal operation is started; and
  notifying the second memory system of the estimated reduced write throughput or the estimated amount of reduction in the write throughput.

14. The method of claim 13, wherein the internal operation includes at least one of a garbage collection operation of the nonvolatile memory, a thermal protection operation for preventing excessive heating of the first memory system, and a power restriction operation for suppressing power consumption of the first memory system to be less than a maximum power allowed thereto.

15. The method of claim 13, wherein
  the internal operation includes a garbage collection operation of the nonvolatile memory, a thermal protection operation for preventing excessive heating of the first memory system, and a power restriction operation for suppressing power consumption of the first memory system to be less than a maximum power allowed thereto;
  the executing the internal operation includes starting one of the garbage collection operation, the thermal protection operation and the power restriction operation, and
  the notifying includes notifying the second memory system of the estimated reduced write throughput or the estimated amount of reduction in the write throughput, and factor data indicating which one of the garbage collection operation, the thermal protection operation and the power restriction operation is a cause for the reduction in the write throughput.

16. The method of claim 13, further comprising:
  notifying the second memory system of recovery of the write throughput, when the write throughput is recovered at an end of the internal operation.

17. The method of claim 13, wherein the notifying includes notifying the second memory system, via the host, of the estimated reduced write throughput or the estimated amount of reduction in the write throughput.

18. The method of claim 13, wherein the second memory system is configured to reduce write throughput of the second memory system on the basis of the notification so as to correspond to the estimated reduced write throughput of the first memory system.

* * * * *